(12) United States Patent
Izaki

(10) Patent No.: US 11,601,586 B2
(45) Date of Patent: Mar. 7, 2023

(54) ELECTRONIC APPARATUS AND CONTROL METHOD THEREFOR

(71) Applicant: CANON KABUSHIKI KAISHA, Tokyo (JP)

(72) Inventor: Yuko Izaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/737,465

(22) Filed: May 5, 2022

(65) Prior Publication Data

US 2022/0264000 A1    Aug. 18, 2022

Related U.S. Application Data

(63) Continuation of application No. 17/115,487, filed on Dec. 8, 2020, now Pat. No. 11,356,598.

(30) Foreign Application Priority Data

Dec. 13, 2019    (JP) .............................. JP2019-225292

(51) Int. Cl.
| | | |
|---|---|---|
| H04N 5/232 | (2006.01) | |
| H04N 5/225 | (2006.01) | |
| G03B 17/02 | (2021.01) | |
| G03B 17/18 | (2021.01) | |
| G06F 3/048 | (2013.01) | |

(52) U.S. Cl.
CPC ..... *H04N 5/23216* (2013.01); *H04N 5/22525* (2018.08); *H04N 5/23229* (2013.01); *H04N 5/23245* (2013.01); *H04N 5/232933* (2018.08)

(58) Field of Classification Search
CPC ......... H04N 5/23216; H04N 5/232933; H04N 5/23229; H04N 5/23245; H04N 5/225; G03B 17/02; G03B 17/18; G06F 3/0482
See application file for complete search history.

(56) References Cited

U.S. PATENT DOCUMENTS

| | | | |
|---|---|---|---|
| 10,764,502 B2 * | 9/2020 | Yoshida | ............. H04N 5/22525 |
| 10,904,428 B2 * | 1/2021 | Kamiya | |
| 11,212,458 B2 * | 12/2021 | Ichikawa | ........... H04N 5/23216 |
| 11,356,598 B2 * | 6/2022 | Izaki | .................. H04N 5/23216 |
| 11,500,458 B2 * | 11/2022 | Ichikawa | ............... A61B 3/113 |
| 2019/0116319 A1 * | 4/2019 | Tokiwa | ................. G06F 3/0362 |
| 2020/0336645 A1 * | 10/2020 | Fukuda | ............... H04N 5/2255 |
| 2021/0127063 A1 * | 4/2021 | Ogawa | ............... H04N 5/23299 |

\* cited by examiner

*Primary Examiner* — Marly S Camargo
(74) *Attorney, Agent, or Firm* — Canon U.S.A., Inc. I.P. Division

(57) ABSTRACT

An electronic apparatus includes a first operation member, a second operation member different from the first operation member, a specific operation unit, and a control unit. Where the electronic apparatus is in a first operation mode and in response to the first operation member being operated, the control unit performs control to execute a specific function different from a switching function of switching a lock setting state of an operation on the specific operation unit. Where the electronic apparatus is in a second operation mode different from the first operation mode and in response to the first operation member being operated, the control unit performs control to execute the switching function. The first operation member is an operation member located on a surface lower in height in a direction perpendicular to an operation surface than a surface on which the second operation member is located.

19 Claims, 15 Drawing Sheets

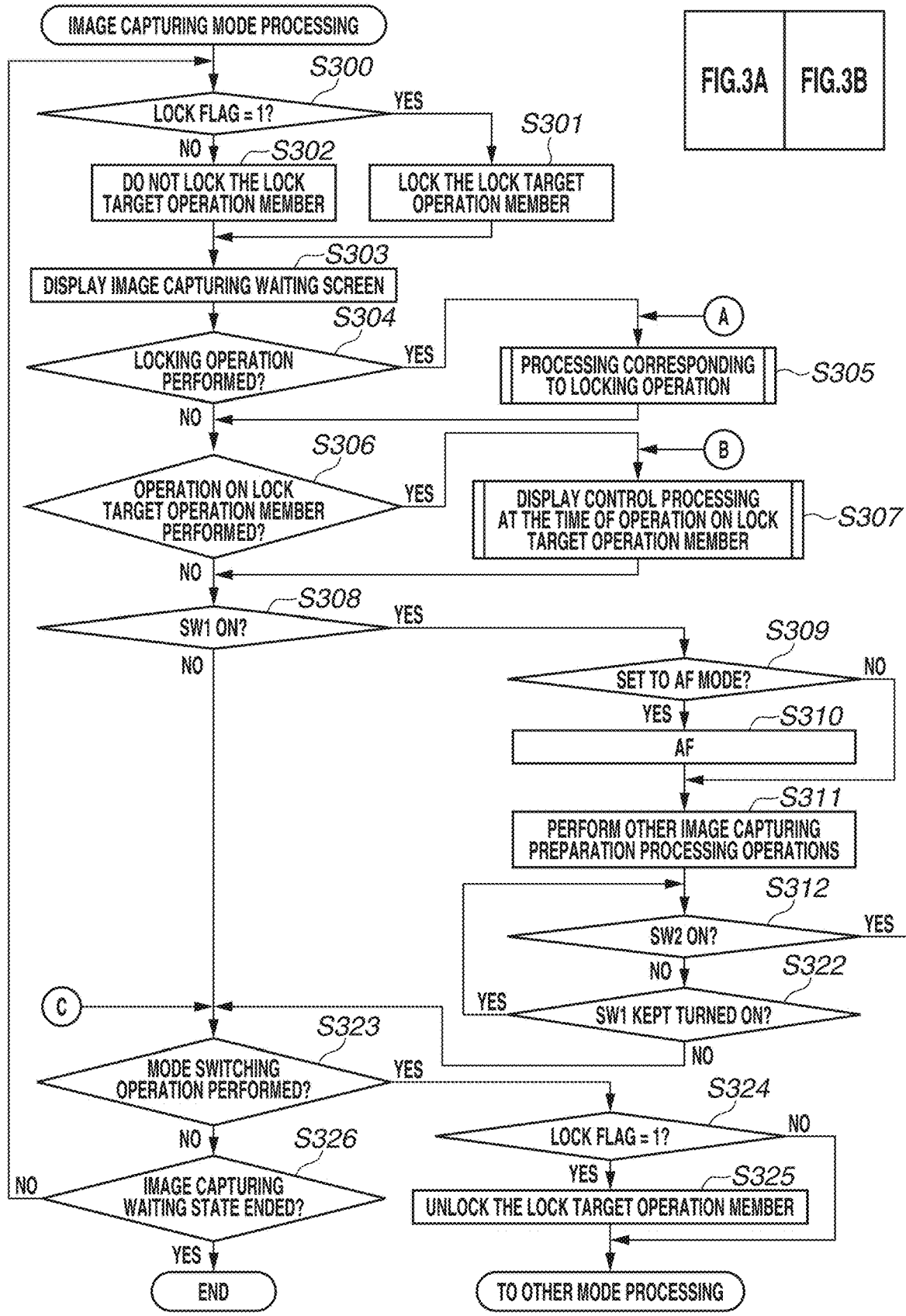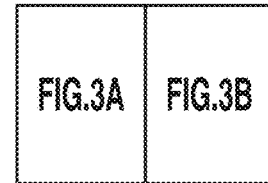

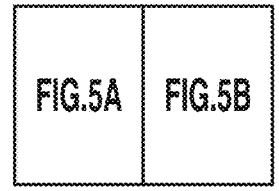
FIG.5A
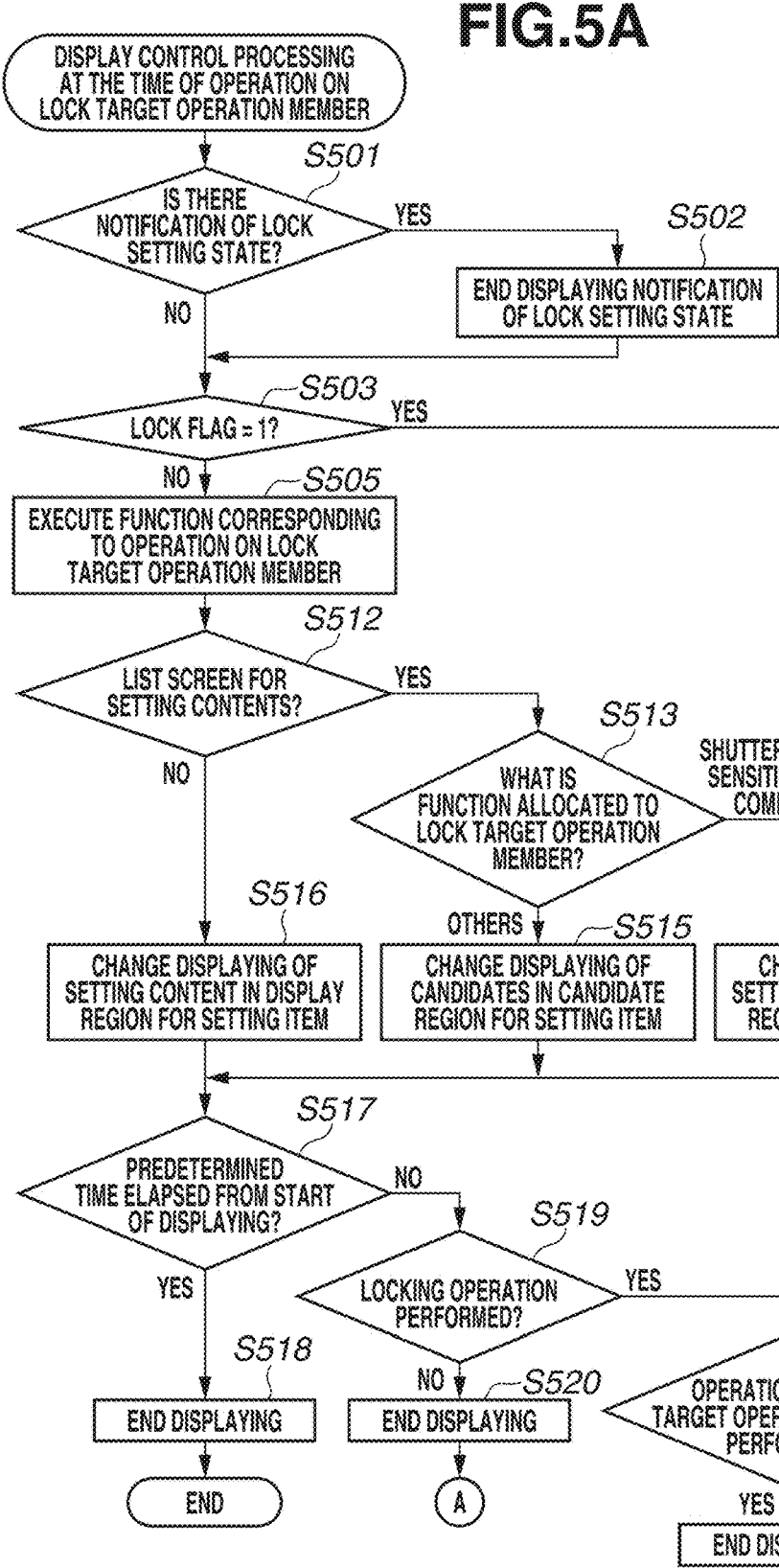

ELECTRONIC APPARATUS AND CONTROL METHOD THEREFOR

CROSS-REFERENCE TO RELATED APPLICATIONS

The present application is a continuation of U.S. patent application Ser. No. 17/115,487, filed on Dec. 8, 2020, which claims priority from Japanese Patent Application No. 2019-225292 filed Dec. 13, 2019, which are hereby incorporated by reference herein in their entireties.

BACKGROUND

Field

Aspects of the present disclosure generally relate to an electronic apparatus capable of switching between enablement and disablement of an operation member and, more particularly, to a control method for locking an operation member.

Description of the Related Art

In conventional electronic apparatuses equipped with various operation members, some known apparatuses are equipped with a lock lever or lock button used to switch between locking an operation member for prevention of erroneous operation and unlocking the operation member. Japanese Patent Application Laid-Open No. 2012-189883 discusses an apparatus in which, while an operation member is locked by a lock lever, when the operation member is manually operated by the user, a warning indicating that the operation member operated is locked is displayed. Such displaying of the warning enables the user to intuitively recognize that the operation which the user has performed is disabled.

However, equipping an apparatus with a dedicated lock lever or lock button used to lock an operation member, such as in the apparatus discussed in Japanese Patent Application Laid-Open No. 2012-189883, hinders a reduction in size of the apparatus. On the other hand, in a case where a function of locking an operation member is configured to be able to be allocated to a different operation member having another function, if the different operation member having another function is mounted at a position where the different operation member is likely to be operated by mistake, there is a possibility that the different operation member with the locking function allocated thereto is operated despite the intention of the user. Thus, there is a possibility that the lock setting state may be switched despite the intention of the user and a setting value may be changed by an operation performed on the operation member which the user has not intended to operate.

SUMMARY

Aspects of the present disclosure are generally directed to an electronic apparatus capable of switching a lock setting state of an operation member without use of any dedicated lock member and reducing the lock setting state of the operation member from being switched without the intention of the user.

According to an aspect of the present disclosure, an electronic apparatus includes a first operation member, a second operation member different from the first operation member, and at least one memory and at least one processor which function as a specific operation unit, and a control unit configured to perform control, wherein, in a case where the electronic apparatus is in a first operation mode and in response to the first operation member being operated, the control unit performs control to execute a specific function different from a switching function of switching a lock setting state of an operation on the specific operation unit, wherein, in a case where the electronic apparatus is in a second operation mode different from the first operation mode and in response to the first operation member being operated, the control unit performs control to execute the switching function, and wherein the first operation member is an operation member located on a surface lower in height in a direction perpendicular to an operation surface than a surface on which the second operation member is located.

Further features of the present disclosure will become apparent from the following description of exemplary embodiments with reference to the attached drawings.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
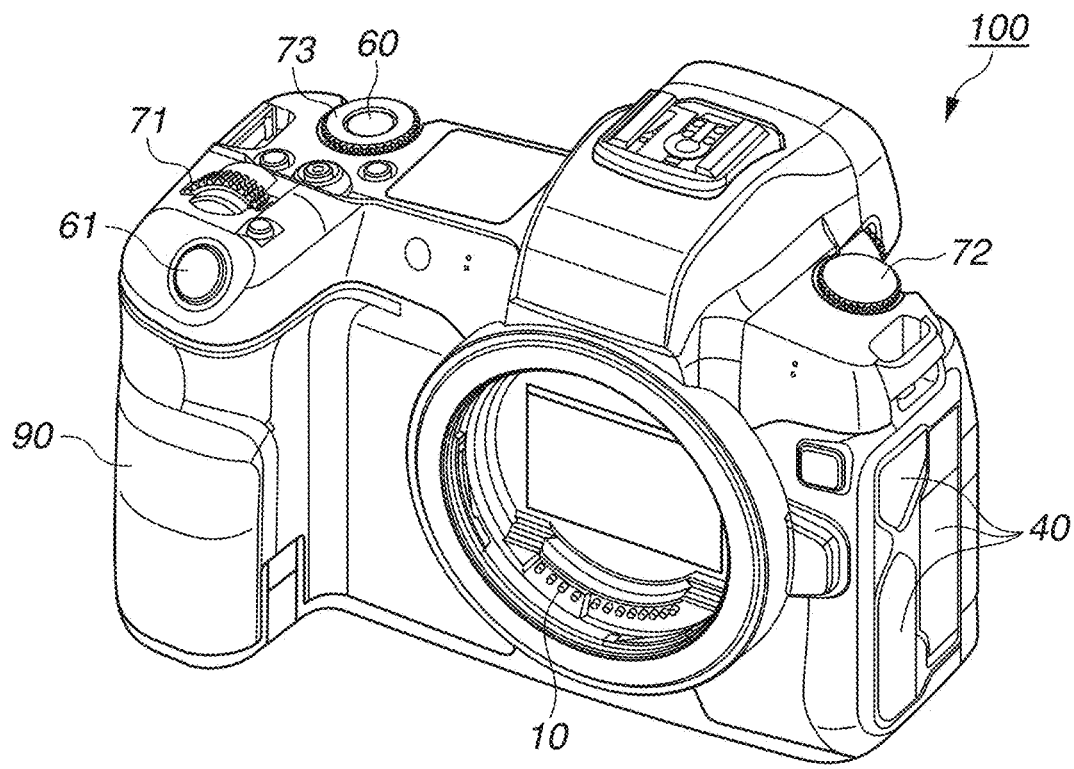
FIGS. 1A and 1B are appearance diagrams of a digital camera.
Figure 1B:
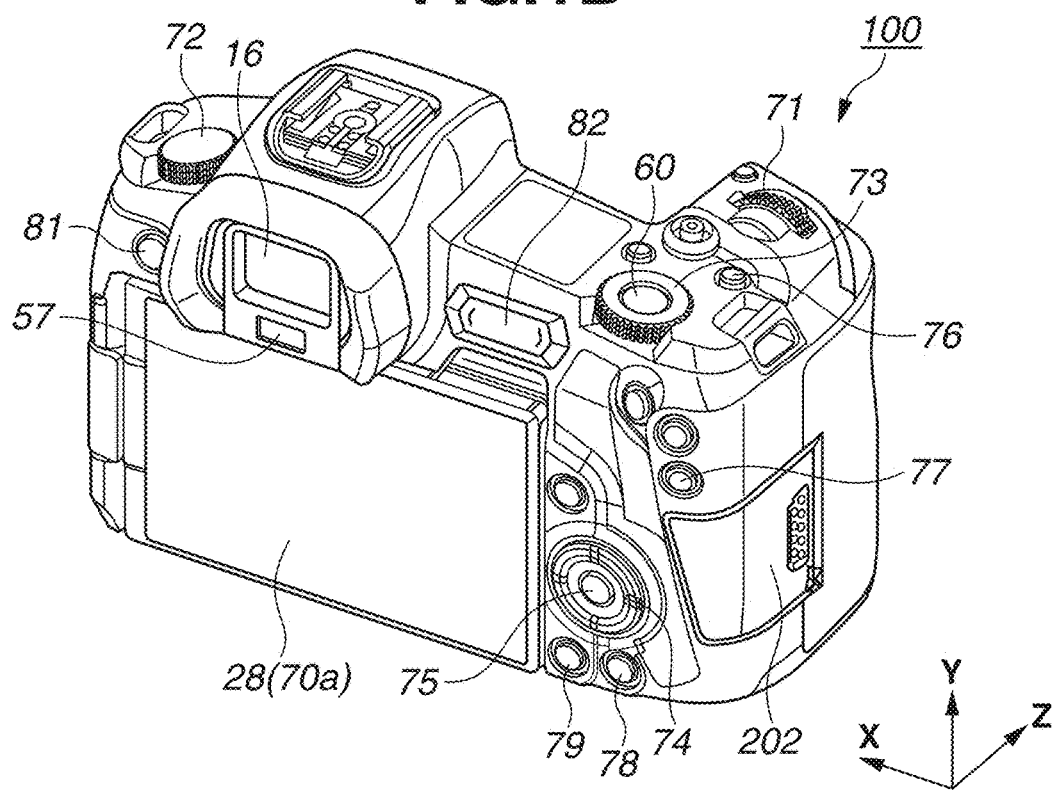

FIGS. 1A and 1B are appearance diagrams of a digital camera 100 serving as an apparatus to which an exemplary embodiment of the present disclosure is applicable. FIG. 1A is a front surface perspective view of the digital camera 100, and FIG. 1B is a back surface perspective view of the digital camera 100. FIG. 1A illustrates an outer appearance of the digital camera 100 in a case where an attachable and detachable lens unit 150 (interchangeable lens) has been detached. Referring to FIGS. 1A and 1B, a display unit 28 is an extra-viewfinder display unit mounted on the back surface of the digital camera 100, which displays an image or various pieces of information. A shutter button 61 is an operation unit which is usable to issue an image capturing instruction. A mode selection switch 60 is an operation unit which is usable to switch between various modes. A terminal cover 40 is a cover which protects connectors (not illustrated) of, for example, a connection cable which interconnects an external device and the digital camera 100. A main electronic dial 71 is a rotational operation member included in an operation unit 70 (FIG. 2), so that the main electronic dial 71 can be rotated by the user to perform, for example, changing of setting values such as a shutter speed and an aperture value (including a function of changing setting values). A power switch 72 is an operation member which is usable to switch between turning-on and turning-off of the power source of the digital camera 100. A sub-electronic dial 73 is a rotational operation member included in the operation unit 70, which is usable to perform, for example, movement of a selection frame or image feeding. Arrow keys 74, which are included in the operation unit 70, are arrow keys (four-way keys) in which upper, lower, left, and right arrow portions thereof are able to be pressed. An operation corresponding to a pressed arrow portion of the arrow keys 74 is able to be performed. A SET button 75 is a push button included in the operation unit 70, which is mainly used to, for example, determine a selection item.

A lock button 76, which is included in the operation unit 70, is usable to perform switching of a lock setting state, i.e., enabling or disabling an operation on the main electronic dial 71, the sub-electronic dial 73, a touch panel 70a, a multifunction (M-Fn) bar 82, and a control ring 83 (FIG. 2), in sequence in response to pressing thereof. Thus, each time the lock button 76 is pressed, the lock setting state, which has been a locked state before pressing of the lock button 76, is switched to an unlocked state and the lock setting state, which has been an unlocked state before pressing of the lock button 76, is switched to a locked state. The M-Fn bar 82 and the control ring 83 are described below. The above-mentioned lock target operation members, which are able to be locked by pressing of the lock button 76, have the possibility of being operated without the intention of the user, and, if the setting value changes from a value set by the user, operability becomes low. To prevent such an erroneous operation from occurring, the lock target operation members are configured to be able to be locked. While, here, the main electronic dial 71, the sub-electronic dial 73, the touch panel 70a, the M-Fn bar 82, and the control ring 83 are taken as examples of lock settable operation members which are selectable as lock target operation members, the present exemplary embodiment is not limited to this. Moreover, lock target operation members are able to be optionally set by the user via a setting menu screen.

Enlargement and reduction buttons 77 illustrated in FIG. 1B, which are included in the operation unit 70, are operation buttons used to switch between turning-on and turning-off of an enlargement mode in live view displaying of the image capturing mode, change the enlargement ratio during the enlargement mode, and decrease the enlargement ratio of the enlarged playback image to reduce the image. In the playback mode, the enlargement and reduction buttons 77 function as buttons used to enlarge or reduce a playback image and increase or decrease the enlargement ratio. A deletion button 78, which is included in the operation unit 70, is an operation button used to delete an image file recorded on a recording medium 200 (FIG. 2) in image capturing processing described below. When pressing the deletion button 78 during playback of an image, the user is able to select whether to delete an image which is being displayed. In, for example, a setting menu screen displayed at times other than during playback of an image, pressing of the deletion button 78 is used to execute a function allocated to the deletion button 78, for example, a function different from image deletion such as returning to a previous screen or transitioning to a page or item higher by one layer. A playback button 79, which is included in the operation unit 70, is an operation button used to switch between the image capturing mode and the playback mode. When the playback button 79 is pressed during the image capturing mode, the digital camera 100 transitions to the playback mode, thus causing the display unit 28 to display the latest image out of images recorded on the recording medium 200. A menu button 81, which is included in the operation unit 70, is an operation button used to transition to displaying of the setting menu screen. The M-Fn bar 82, which is included in the operation unit 70, is an operation member (operation bar) which is able to be operated along the horizontal direction. Various functions are able to be allocated to a slide operation and touch operations on both ends of the M-Fn bar 82.

A communication terminal group 10 is a communication terminal group via which the digital camera 100 performs communication with the lens unit 150 (FIG. 2) (attachable to and detachable from the digital camera 100) described below. An eyepiece unit 16 is an eyepiece viewfinder (a looking-into-type viewfinder), so that the user is able to visually recognize a video image displayed on an internal electronic viewfinder (EVF) 29 (FIG. 2) via the eyepiece unit 16. The EVF 29 is an intra-viewfinder display unit. An eye access detection unit 57 is an eye access detection sensor which detects whether the user is accessing the eyepiece unit 16. A lid 202 is the lid of a slot which contains the recording medium 200. A grip portion 90 is a holding portion configured to be in a shape able to be easily gripped by the right hand of the user when the user holds the digital camera 100. The shutter button 61 and the main electronic dial 71 are located at positions where the shutter button 61 and the main electronic dial 71 are able to be operated with the index finger of the right hand in a state in which the user holds the digital camera 100 by gripping the grip portion 90 with the little finger, ring finger, and middle finger of the right hand. Moreover, the sub-electronic dial 73 is located at a position where the sub-electronic dial 73 is able to be operated with the thumb of the right hand in the same state.

Figure 2:
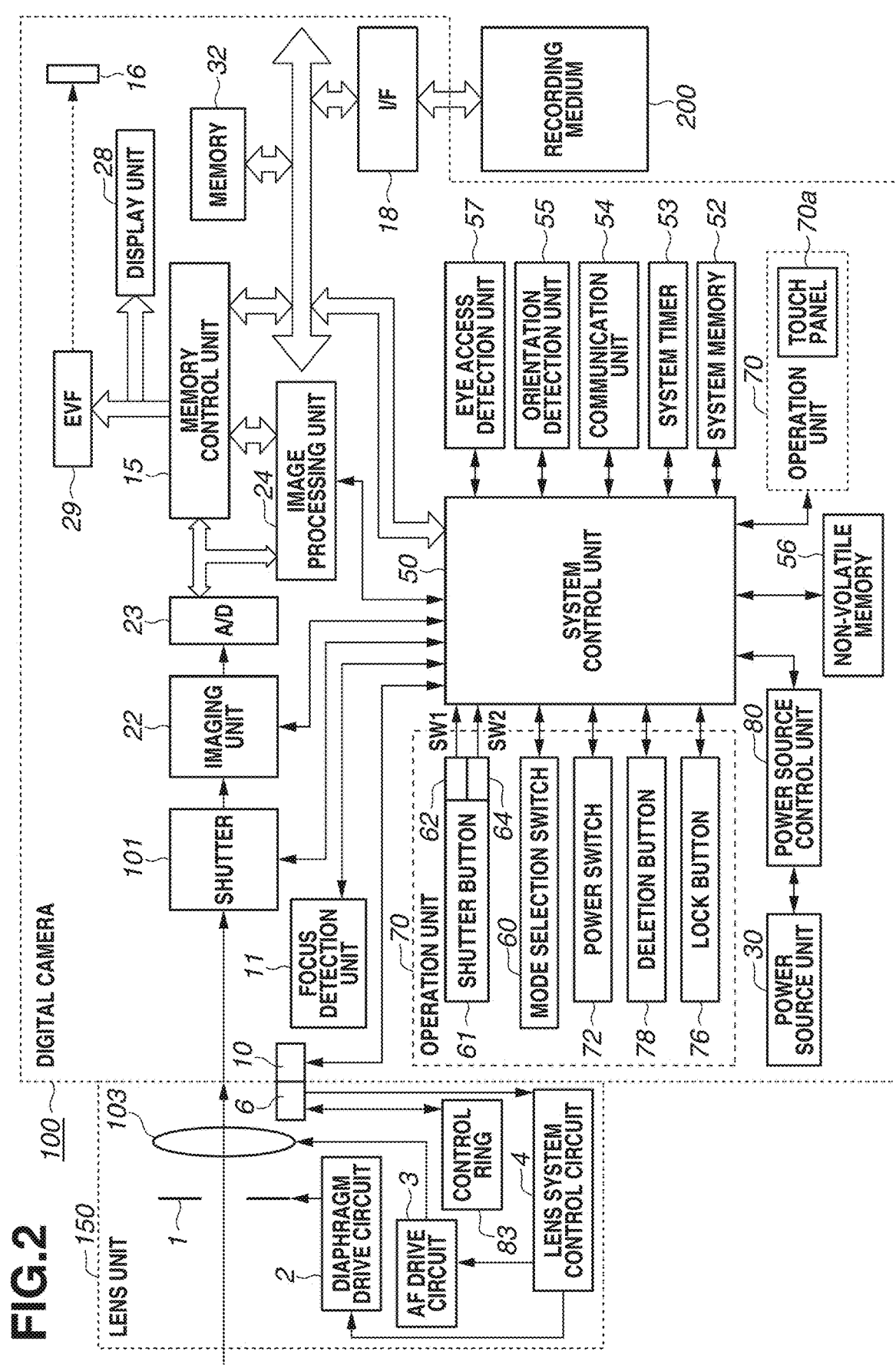
FIG. 2 is a block diagram illustrating a configuration of the digital camera.

FIG. 2 is a block diagram illustrating a configuration example of the digital camera 100 according to the present exemplary embodiment. In FIG. 2, the lens unit 150 is a lens unit in which an interchangeable image capturing lens is mounted. A lens 103 may be composed of a plurality of lens elements, but, in FIG. 2, is illustrated as a single lens element. A communication terminal 6 is a communication terminal used for the lens unit 150 to perform communication with the digital camera 100. The lens unit 150 performs communication with a system control unit 50 via the communication terminal 6 and the above-mentioned communication terminal group 10, and causes a lens system control circuit 4, which is included in the lens unit 150, to perform control of a diaphragm 1 via a diaphragm drive circuit 2. Then, the lens unit 150 varies the position of the lens 103 via an autofocus (AF) drive circuit 3, thus adjusting focus.

The control ring 83 is a dial operation member which is able to be operated for rotation around a lens barrel of the lens unit 150.

A focus detection unit 11 outputs defocus amount information to the system control unit 50. The system control unit 50 controls the lens unit 150 based on the defocus amount information, thus performing phase-difference AF.

A shutter 101 is a focal plane shutter configured to freely control the exposure time of the imaging unit 22 under the control of the system control unit 50.

The imaging unit 22 is an image sensor configured with, for example, a charge-coupled device (CCD) sensor or a complementary metal-oxide semiconductor (CMOS) sensor, which converts an optical image into an electrical signal. An analog-to-digital (A/D) converter 23 is used to convert an analog signal output from the imaging unit 22 into a digital signal.

An image processing unit 24 performs predetermined pixel interpolation, resizing processing such as reduction, and color conversion processing on the data output from the A/D converter 23 or data read out from a memory control unit 15 described below. Moreover, the image processing unit 24 performs predetermined calculation processing using the captured image data. The system control unit 50 performs exposure control and distance measurement control based on a calculation result obtained by the image processing unit 24. With this, autofocus (AF) processing of the through-the-lens (TTL) type, automatic exposure (AE) processing, and electronic flash (EF) (flash preliminary light emission) processing are performed. The image processing unit 24 further performs predetermined calculation processing using the captured image data, and performs automatic white balance (AWB) processing of the TTL type based on the obtained calculation result.

The memory control unit 15 controls transmission and reception of data between the A/D converter 23, the image processing unit 24, and a memory 32. Data output from the A/D converter 23 is then written in the memory 32 via the image processing unit 24 and the memory control unit 15 or directly via the memory control unit 15 without via the image processing unit 24. The memory 32 stores image data acquired by the imaging unit 22 and converted into digital data by the A/D converter 23 or image data that is to be displayed on the display unit 28 and the EVF 29. The memory 32 has a storage capacity sufficient to store a predetermined number of still images or a moving image and sound taken for a predetermined time.

Moreover, the memory 32 also serves as a memory for image display (video memory). Image data for display written in the memory 32 is displayed by the display unit 28 and the EVF 29 via the memory control unit 15. Each of the display unit 28 and the EVF 29 performs displaying corresponding to a signal output from the memory control unit 15 on a display device such as a liquid crystal display (LCD) or an organic electroluminescent (EL) display. Sequentially transferring to and displaying on the display unit 28 or the EVF 29 the data analog-to-digital converted by the A/D converter 23 and stored in the memory 32 enables performing live view display (LV display). Hereinafter, an image which is displayed in live view is referred to as a "live view image (LV image)".

A non-volatile memory 56 is an electrically erasable and recordable memory, for which, for example, a flash read-only memory (flash-ROM) is used. For example, constants and a program for operations of the system control unit 50 are stored in the non-volatile memory 56. The program as used here is a computer program (computer-executable instructions) which is executed to implement various flowcharts described below in the present exemplary embodiment.

The system control unit 50 is a control unit composed of at least one processor or circuit, and controls the entire digital camera 100. The system control unit 50 implements various processing operations described below in the present exemplary embodiment by executing the above-mentioned program recorded on the non-volatile memory 56. A system memory 52 includes, for example, a random access memory (RAM), on which, for example, constants and variables for operations of the system control unit 50 and a program read out from the non-volatile memory 56 are loaded. Moreover, the system control unit 50 also performs display control by controlling, for example, the memory 32 and the display unit 28.

A system timer 53 is a timer unit which measures times for use in various control operations and time in a built-in clock.

The mode selection switch 60, which is included in the operation unit 70, switches an operation mode of the system control unit 50 to any one of, for example, a still image capturing mode and a moving image capturing mode. Modes included in the still image capturing mode include an automatic image capturing mode, an automatic scene discrimination mode, a manual mode, an aperture priority mode (Av mode), a shutter speed priority mode (Tv mode), and a program automatic exposure (AE) mode (P mode). Moreover, the modes included in the still image capturing mode further include, for example, various scene modes in which image capturing settings for the respective image capturing scenes are performed and a custom mode. The mode selection switch 60 is used to directly switch the operation mode of the system control unit 50 to any one of these modes. Alternatively, after switching to displaying of a list screen for image capturing modes is once performed by the mode selection switch 60, another operation member can also be used to perform switching to any one of a plurality of image capturing modes displayed in the list screen. Likewise, a plurality of modes can also be included in the moving image capturing mode.

The first shutter switch 62 is configured to be turned on in response to a halfway operation, in other words, a half-pressed state, of the shutter button 61 of the digital camera 100 (an image capturing preparation instruction), thus generating a first shutter switch signal SW1. In response to the first shutter switch signal SW1, image capturing preparation operations, such as autofocus (AF) processing, automatic exposure (AE) processing, automatic white balance (AWB) processing, and flash preliminary emission (EF) processing, are started.

The second shutter switch 64 is configured to be turned on in response to a complete operation, in other words, a fully-pressed state, of the shutter button 61 (an image capturing instruction), thus generating a second shutter switch signal SW2. In response to the second shutter switch signal SW2, the system control unit 50 starts a series of image capturing processing operations starting with a signal readout operation from the imaging unit 22 and leading to a writing operation for the captured image data as an image file to the recording medium 200. When the second shutter switch 64 continues being turned on, the digital camera 100 performs continuous shooting (continuous image capturing) at a speed which depends on a predetermined continuous shooting feasible speed.

A power source control unit 80 is configured with, for example, a battery detection circuit, a direct current (DC)-DC converter, and a switch circuit for switching blocks to be energized, and detects the presence or absence of attachment of a battery, the type of a battery, and the remaining amount of battery power. Moreover, the power source control unit 80 controls the DC-DC converter based on a result of such detection and an instruction from the system control unit 50, and supplies required voltages to various portions, including the recording medium 200, for respective required periods. A power source unit 30 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter.

A recording medium interface (I/F) 18 is an interface with the recording medium 200, such as a memory card or a hard disk. The recording medium 200 is a recording medium, such as a memory card, which is used to record the captured image, and is configured with, for example, a semiconductor memory or a magnetic disc.

A communication unit 54 connects to an external device or a network via wireless or via a wired cable, and performs transmission and reception of, for example, a video signal and an audio signal. The communication unit 54 is also able to connect to a wireless local area network (LAN) or the Internet. Moreover, the communication unit 54 is also able to connect to an external device via a wireless technology standard such as Bluetooth® or Bluetooth® Low Energy. The communication unit 54 is able to transmit an image (including a live view image) captured by the imaging unit 22 and an image recorded on the recording medium 200, and is also able to receive an image or various other pieces of information from an external device.

An orientation detection unit 55 detects the orientation of the digital camera 100 with respect to the direction of gravitational force. Whether an image captured by the imaging unit 22 is an image captured with the digital camera 100 held in a landscape orientation or an image captured with the digital camera 100 held in a portrait orientation can be discriminated based on the orientation detected by the orientation detection unit 55. The system control unit 50 is able to append orientation information corresponding to the orientation detected by the orientation detection unit 55 to an image file of the image captured by the imaging unit 22 or to perform recording with an image rotated. The orientation detection unit 55 to be used includes, for example, an acceleration sensor and a gyroscope sensor. The acceleration sensor or gyroscope sensor serving as the orientation detection unit 55 is able to be used to detect motions of the digital camera 100 (for example, panning, tilting, lifting, and remaining still or not).

The eye access detection unit 57 is an eye access detection sensor which detects the access (eye access) and the departure (eye departure) of the eye of the user (an object) with respect to the eyepiece unit 16 (i.e., performs access detection). The system control unit 50 switches between displaying (display state) and non-displaying (non-display state) of each of the display unit 28 and the EVF 29 according to the state detected by the eye access detection unit 57. More specifically, in a case where the digital camera 100 is at least in an image capturing waiting state and the switching setting for a display destination of a live view image captured by the imaging unit 22 is automatic switching setting, during non-eye access, the system control unit 50 sets the display unit 28 as the display destination, thus turning on displaying of the display unit 28 and setting the EVF 29 to non-displaying. Moreover, during eye access, the system control unit 50 sets the EVF 29 as the display destination, thus turning on displaying of the EVF 29 and setting the display unit 28 to non-displaying. The eye access detection unit 57 can be configured with, for example, an infrared proximity sensor, and is able to detect the access of an object of some kind to the eyepiece unit 16 of the viewfinder having the EVF 29 incorporated therein. In a case where an object has accessed the eyepiece unit 16, infrared light projected from a light projection portion (not illustrated) of the eye access detection unit 57 is reflected from the object and is then received by a light receiving portion (not illustrated) of the eye access detection unit 57. The eye access detection unit 57 is also able to discriminate up to which distance to the eyepiece unit 16 the object has come close (eye access distance), based on the amount of the received infrared light. In this way, the eye access detection unit 57 performs eye access detection for detecting the access distance of the object to the eyepiece unit 16. In a case where, starting with the non-eye access state (non-access state), an object which comes close to the eyepiece unit 16 within a predetermined distance has been detected, the eye access detection unit 57 is assumed to detect that eye access has been performed. In a case where, starting with the eye access state (access state), an object the access of which has been detected departs from the eyepiece unit 16 by a predetermined distance or more, the eye access detection unit 57 is assumed to detect that eye departure has been performed. A threshold value used for detecting eye access and a threshold value used for detecting eye departure can be made different from each other by providing, for example, a hysteresis. Moreover, after detecting eye access, the eye access detection unit 57 is assumed to detect that the eye access state continues until detecting eye departure. After detecting eye departure, the eye access detection unit 57 is assumed to detect that the non-eye access state continues until detecting eye access. Furthermore, the infrared proximity sensor is merely an example, and the eye access detection unit 57 can be configured with another type of sensor as long as it is able to detect the access of the eye or object which is able to be deemed as eye access.

Moreover, one of members of the operation unit 70 is a touch panel 70a which is capable of detecting contact with the display unit 28. The touch panel 70a and the display unit 28 can be configured in an integrated manner. For example, the touch panel 70a is configured to have such a light transmittance as not to hinder displaying performed by the display unit 28, and is attached to the upper layer of a display surface of the display unit 28. Then, the input coordinates in the touch panel 70a are associated with the display coordinates on a display screen of the display unit 28. With this, a graphical user interface (GUI) can be configured as if the user were able to directly operate a screen displayed on the display unit 28. The system control unit 50 is able to detect the following operations performed on the touch panel 70a or states thereof:

the state in which a finger or pen, which has not been touching the touch panel 70a, has newly touched the touch panel 70a, in other words, starting of a touch (hereinafter referred to as "touch-down");

the state in which a finger or pen is touching the touch panel 70a (hereinafter referred to as "touch-on");

the state in which a finger or pen is moving while touching the touch panel 70a (hereinafter referred to as "touch-move");

the state in which a finger or pen, which has been touching the touch panel 70a, has been separated from the touch panel 70a, in other words, ending of a touch (hereinafter referred to as "touch-up"); and the state in which none is touching the touch panel 70a (hereinafter referred to as "touch-off").

When touch-down is detected, touch-on is also detected at the same time. After touch-down, unless touch-up is detected, touch-on normally continues being detected. Touch-move is also detected in the state in which touch-on is detected. Even if touch-on is detected, unless the touch position is not moving, touch-move is not detected. After touch-up of all of the fingers or pen touching the touch panel 70a is detected, touch-off is detected.

Information on these operations or states and the coordinates of a position at which a finger or pen is touching the touch panel 70a is communicated to the system control unit 50 via an internal bus, and then, the system control unit 50 determines how an operation (touch operation) has been performed on the touch panel 70a based on the communicated information. With regard to touch-move, the system control unit 50 is able to also detect the direction of movement of a finger or pen moving on the touch panel 70a for each of a vertical component and a horizontal component on the touch panel 70a based on a change of the position coordinates. When it is detected that touch-move has been performed a predetermined distance or more, the system control unit 50 is assumed to determine that a slide operation has been performed. An operation of quickly moving the finger a certain degree of distance while keeping the finger touching the touch panel 70a and then directly separating the finger from the touch panel 70a is referred to as "flick". In other words, the flick is an operation of quickly tracing the surface of the touch panel 70a as if flicking the touch panel 70a with the finger. When touch-move performed a predetermined distance or more at a predetermined speed or higher is detected and touch-up is then detected, the system control unit 50 determines that flick has been performed (determines that flick has been performed subsequent to a slide operation).

Additionally, a touch operation of concurrently touching a plurality of positions (for example, two points) and then moving the touch positions closer to each other is referred to as "pinch-in", and a touch operation of moving the touch positions away from each other is referred to as "pinch-out". Pinch-out and pinch-in are collectively referred to as a "pinch operation" (or as "pinch"). The touch panel 70a can be any type of touch panel selected from among touch panels of various types including, for example, the resistance film type, the capacitance type, the surface acoustic wave type, the infrared ray type, the electromagnetic induction type, the image recognition type, and the optical sensor type. Among these types, there are a type which detects that touch has been performed based on contact with the touch panel and a type which detects that touch has been performed based on access of a finger or pen to the touch panel, but any one of the two types can be employed.

In the present exemplary embodiment, display control processing for a notification performed in a case where the lock setting state of a lock target operation member which is able to be locked has been switched or a case where an operation has been performed on an operation member which is currently locked, in the digital camera 100, is described. Moreover, in the present exemplary embodiment, the resolution of the display unit 28 is assumed to be 900 pixels in width×600 pixels in height.

In the present exemplary embodiment, the lock setting state of a lock target operation member is able to be switched by a locking operation (for example, pressing of the lock button 76). The lock target operation member is able to be set via setting menu screens such as those illustrated in FIGS. 11A and 11B. Lock settable operation members are displayed as indicated by setting candidates 1101 to 1105 illustrated in FIG. 11A. In the setting candidates 1101 to 1105, operation members are indicated by respective icons. The name of an operation member on which a cursor is currently displayed is displayed in a field 1110. As indicated in each of the setting candidates 1102 and 1105, checking a checkbox enables the operation member to be set as a lock target operation member the lock setting state of which is to be switched.

Figure 11A:
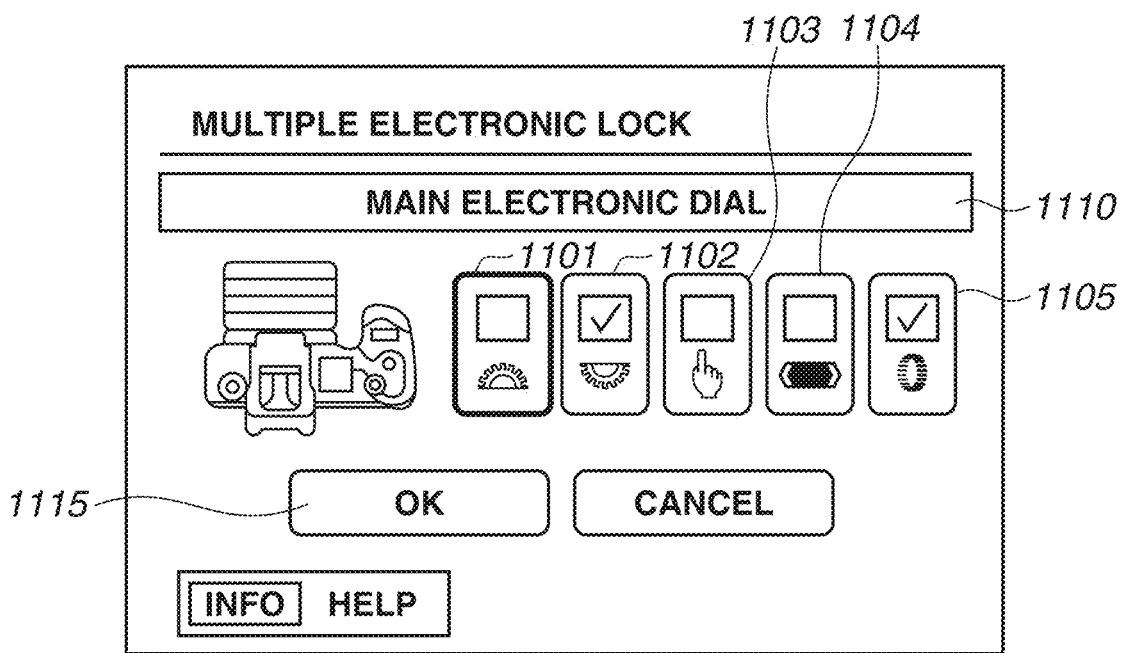
FIGS. 11A and 11B are diagrams each illustrating an example of displaying of a setting menu screen concerning locking.

The setting candidate 1101 represents the main electronic dial 71, which is drawn with an icon indicated by a semicircle which is convex upward. The setting candidate 1102 represents the sub-electronic dial 73, which is drawn with an icon indicated by a semicircle which is convex downward. The setting candidate 1103 represents the touch panel 70a, which is drawn with an icon of the index finger of the right hand. The setting candidate 1104 represents the M-Fn bar 82, which is drawn with a rectangle-shaped icon which is long in the horizontal direction as indicated by the M-Fn bar 82 illustrated in FIG. 1B. The setting candidate 1105 represents the control ring 83, which is drawn with an icon which is obtained by slicing a part of a cylindrical member into a ring and indicates that the member is able to be operated in a circumferential direction. In FIG. 11A, a cursor is displayed on the setting candidate 1101, and a text "main electronic dial" is displayed in the field 1110. While, in the present exemplary embodiment, lock settable operation members which are able to be selected (set) as lock target operation members include five operation members, i.e., the main electronic dial 71, the sub-electronic dial 73, the touch panel 70a, the M-Fn bar 82, and the control ring 83, the present exemplary embodiment is not limited to this. For example, the lock settable operation members can include an operation member which is able to be operated for rotation called a "controller wheel" (not illustrated), which is used to, for example, designate a selection item together with the arrow keys 74. The controller wheel is located outside the circumference of the arrow keys 74 or as a replacement for the arrow keys 74, and is used to control various operations of the digital camera 100 according to the amount of operation for rotational operation.

Moreover, in the present exemplary embodiment, the user is allowed to optionally allocate the setting change function of a setting item to each of the lock settable operation members in the setting menu screen. However, a configuration in which, from the beginning, items to be allocated to the respective operation members are previously determined (fixed) can be employed. Thus, the present exemplary embodiment can also be applied to a case where an operation member and the setting change function of an item are previously determined while being associated with each other. As long as an operation member and the setting change function of an item are previously associated with each other, when changing the setting content of a desired item, the user is able to easily recognize which operation member the user should operate.

FIG. 11A illustrates a case where the sub-electronic dial 73 and the control ring 83 are currently set as lock target operation members.

Figure 3B:
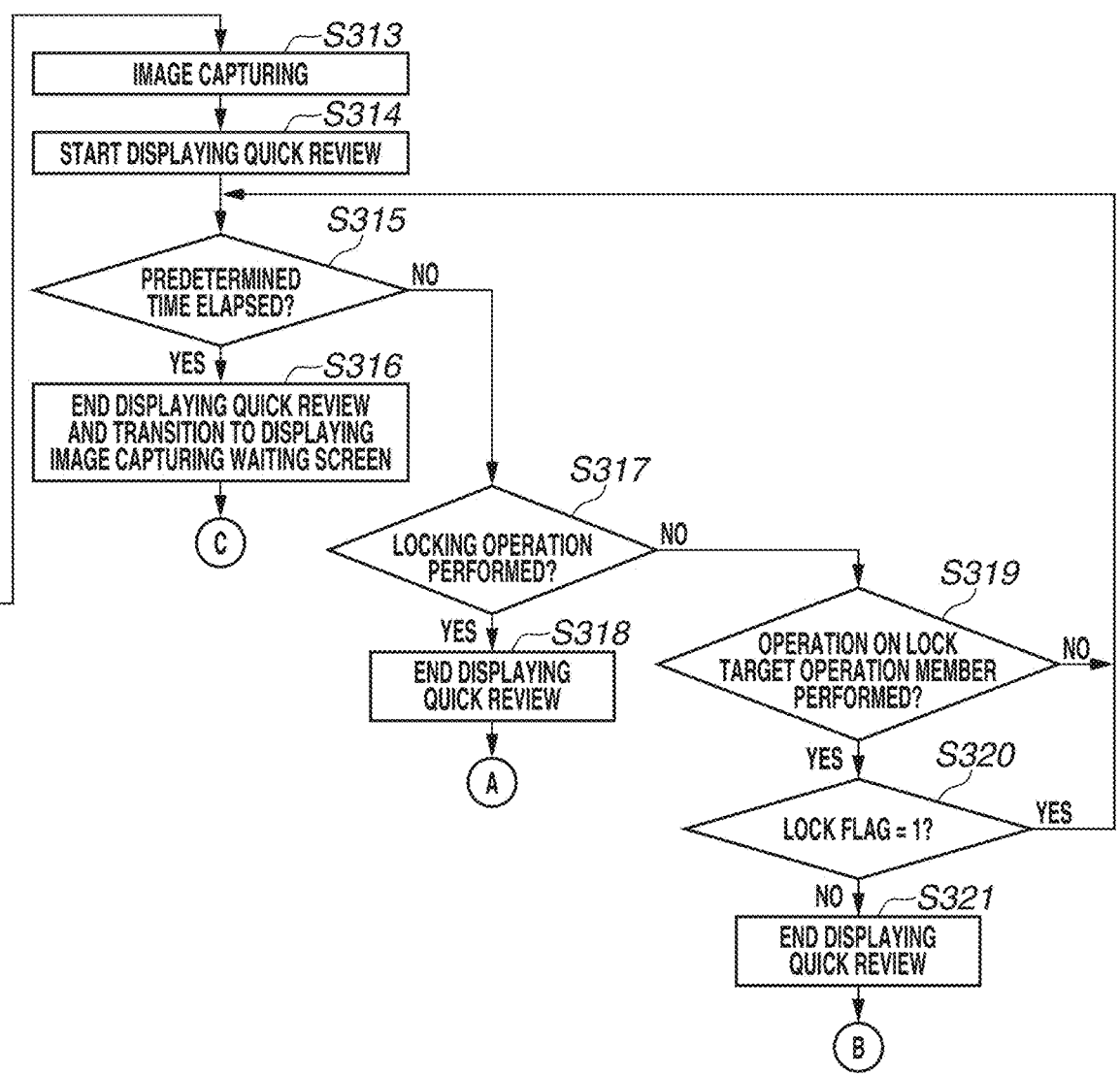
FIG. 3, which is composed of FIGS. 3A and 3B, is a flowchart illustrating image capturing mode processing.
Figure 4:
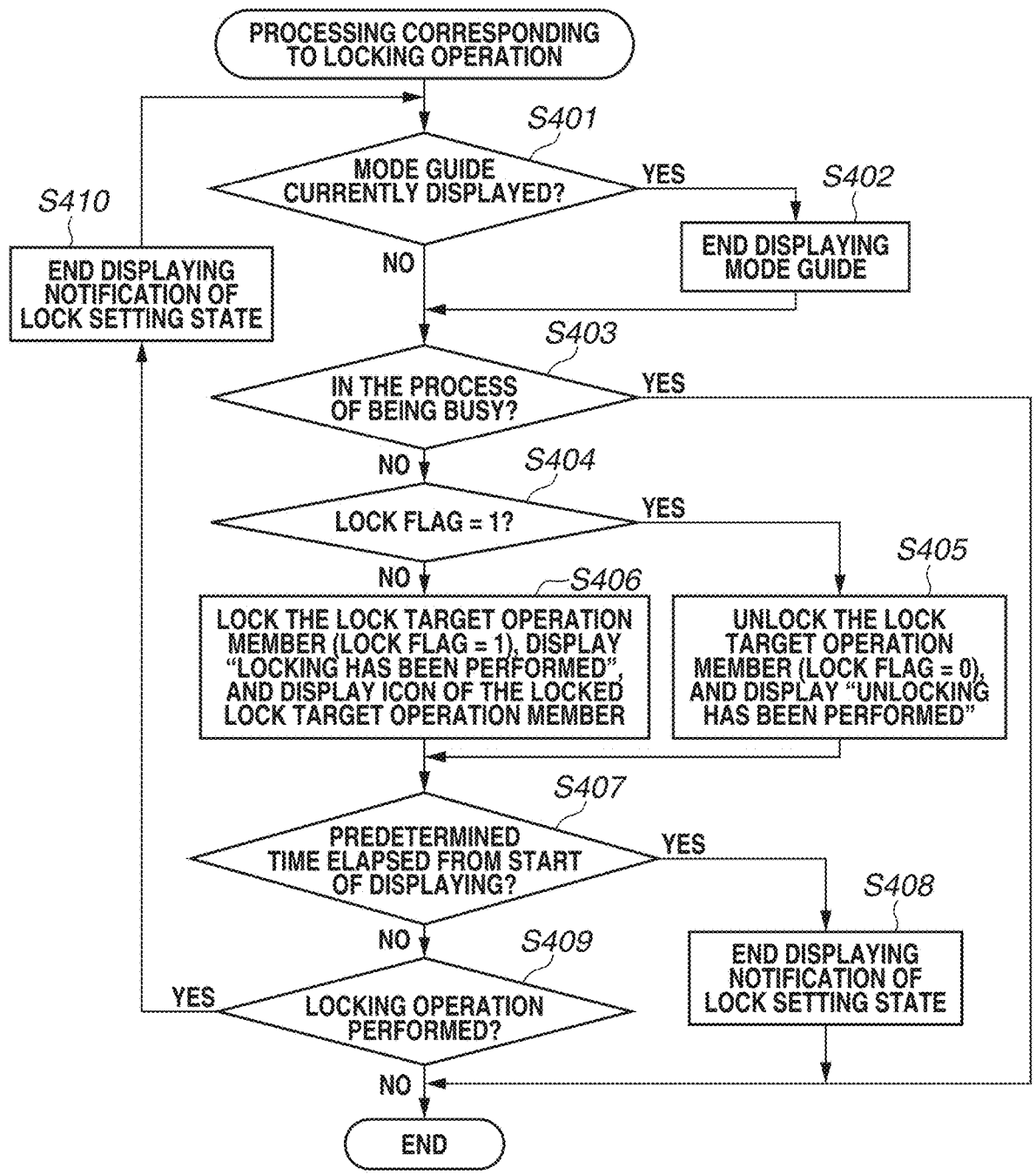
FIG. 4 is a flowchart illustrating processing which is performed in response to a locking operation in the image capturing mode processing.
Figure 5B:
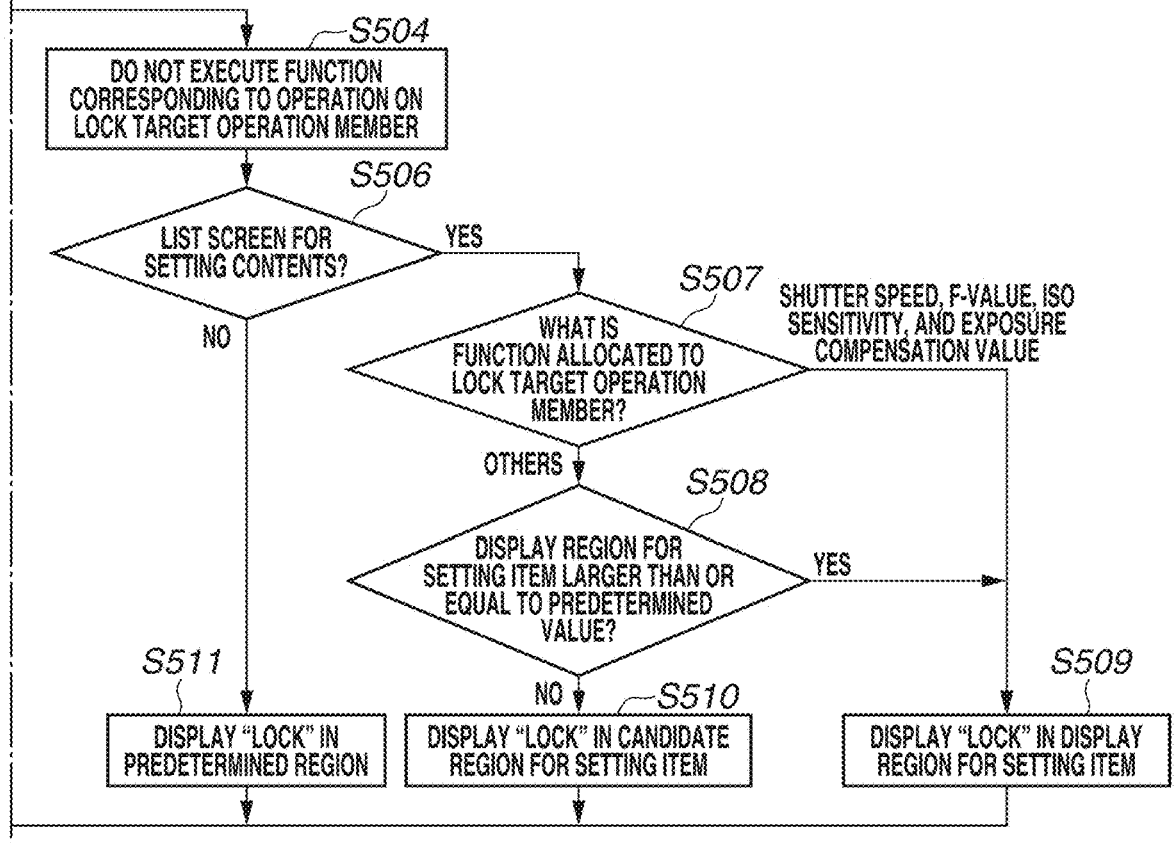
FIG. 5, which is composed of FIGS. 5A and 5B, is a flowchart illustrating display control processing performed at the time of an operation on a lock target operation member which is being able to be locked in the image capturing mode processing.

FIG. 3, which is composed of FIGS. 3A and 3B, to FIG. 5, which is composed of FIGS. 5A and 5B, are flowcharts illustrating control processing for performing display control in cases where switching of the lock setting state for operation on a lock target operation member which is able to be locked and an operation on the lock target operation member have been performed. The control processing is implemented by the system control unit 50 loading a program stored in the non-volatile memory 56 onto the system memory 52 and executing the program. The flowcharts of FIG. 3 to FIG. 5 are started in a case where the digital camera 100 is started up in the image capturing mode and is then in the image capturing waiting state.

In step S300, the system control unit 50 refers to the non-volatile memory 56 and determines whether a lock flag is "1". If it is determined that the lock flag is "1" (YES in step S300), the system control unit 50 advances the processing to step S301, and, if it is determined that the lock flag is "0" (NO in step S300), the system control unit 50 advances the processing to step S302. The lock flag is a flag indicating a lock setting state which has been switched by a locking operation. If the lock flag is "1", the lock target operation member is currently locked (is in the locked state), and, if the lock flag is "0", the lock target operation member is not currently locked (is in the unlocked state). Checking the lock flag in step S300 is performed to enable performing an operation on the lock target operation member irrespective of the lock flag in the case of other mode processing which is different from image capturing mode processing described below. In a case where the digital camera 100 has transitioned from the other mode processing to the image capturing mode processing, if the lock flag is "1", the system control unit 50 sets the lock target operation member to a locked state. Even in a case where the power supply of the digital camera 100 has changed from turning-off to turning-on, the system control unit 50 checks the lock flag for a similar reason.

In step S301, the system control unit 50 locks the lock target operation member, and then advances the processing to step S303. Thus, the system control unit 50 sets the lock target operation member to a locked state. The system control unit 50 refers to the non-volatile memory 56 and locks a lock target operation member which the user has set in the setting menu screen. Specifically, in the case of the setting such as that illustrated in FIG. 11A, the system control unit 50 locks the sub-electronic dial 73 and the control ring 83 and does not lock the main electronic dial 71, the touch panel 70*a*, and the M-Fn bar 82.

In step S302, the system control unit 50 does not lock the lock target operation member (enables performing an operation on the lock target operation member), and then advances the processing to step S303. Thus, the system control unit 50 sets the lock target operation member to an unlocked state. The system control unit 50 refers to the non-volatile memory 56 and enables the user to perform an operation on a lock target operation member which the user has set in the setting menu screen.

In step S303, the system control unit 50 displays an image capturing waiting screen on the display unit 28. The image capturing waiting screen in the present exemplary embodiment includes two types of screens, i.e., a screen for displaying an LV image such as that illustrated in FIG. 7C and a screen for displaying a list of setting contents (a list screen for setting contents) such as that illustrated in FIG. 8A.

In step S304, the system control unit 50 determines whether a locking operation has been performed. For example, the system control unit 50 determines whether pressing of the lock button 76 has been performed. If it is determined that a locking operation has been performed (YES in step S304), the system control unit 50 advances the processing to step S305, and, if it is determined that pressing of the lock button 76 has not been performed (NO in step S304), the system control unit 50 advances the processing to step S306. Moreover, in a case where an operation on another operation member to which a locking function (switching function for lock and unlock) has been allocated has been performed, the result of determination in step S304 also becomes YES. A configuration in which a locking function is able to be allocated to another operation member which is not exclusively used for locking and an operation member which is exclusively used for locking is not mounted, to attain a reduction in size and conserve space, can also be employed. For example, a locking function can also be allocated to a button having a function which is not used in the image capturing waiting state, such as the deletion button 78. Allocation of a locking function to another button is described below with reference to FIG. 11B.

In step S305, the system control unit 50 performs processing corresponding to the locking operation. Processing in step S305 is described below with reference to FIG. 4.

In step S306, the system control unit 50 determines whether an operation on the lock target operation member has been performed. If it is determined that the operation has been performed (YES in step S306), the system control unit 50 advances the processing to step S307, and, if it is determined that the operation has not been performed (NO in step S306), the system control unit 50 advances the processing to step S308. For example, in the case of the setting state illustrated in FIG. 11A, if an operation on the sub-electronic dial 73 or the control ring 83 has been performed, the result of determination in step S306 becomes YES, and, even if an operation on the main electronic dial 71, the touch panel 70*a*, or the M-Fn bar 82 has been performed, the result of determination in step S306 does not become YES.

In step S307, the system control unit 50 performs display control processing which is to be performed in a case where an operation on the lock target operation member has been performed. Processing in step S307 is described below with reference to the flowchart of FIG. 5.

In step S308, the system control unit 50 determines whether the first shutter switch 62 has been turned on. If it is determined that the first shutter switch 62 has been turned on (YES in step S308), the system control unit 50 advances the processing to step S309, and, if not so (NO in step S308), the system control unit 50 advances the processing to step S323. The first shutter switch 62 being turned on means a state in which the shutter button 61 is in the half-pressed state as mentioned above. Thus, it is assumable that the user is going to perform image capturing.

In step S309, the system control unit 50 determines whether the focus mode is currently set to an autofocus (AF) mode. If it is determined that the focus mode is currently set to the AF mode (YES in step S309), the system control unit 50 advances the processing to step S310, and, if not so (if it is determined that the focus mode is currently set to a manual focus (MF) mode) (NO in step S309), the system control unit 50 advances the processing to step S311. Switching between the AF mode and the MF mode is able to be performed by using, for example, a setting menu screen or a switch provided on the exterior portion of the lens unit 150.

In step S310, the system control unit 50 performs AF processing based on an AF frame position.

In step S311, the system control unit 50 performs other image capturing preparation processing operations such as automatic exposure (AE) and automatic white balance (AWB).

In step S312, the system control unit 50 determines whether the second shutter switch 64 has been turned on. If it is determined that the second shutter switch 64 has been turned on, i.e., the shutter button 61 has been fully pressed (YES in step S312), the system control unit 50 advances the processing to step S313, and, if not so (NO in step S312), the system control unit 50 advances the processing to step S322.

In step S313, the system control unit 50 performs a series of image capturing processing operations leading to recording a captured image as an image file on the recording medium 200.

In step S314, the system control unit 50 starts displaying a quick review. The quick review means a review display screen in which to temporarily display an image captured in step S313 on the display unit 28 immediately after image capturing. Furthermore, a time for which to temporarily display a captured image on the display unit 28 as a quick review is able to be optionally set by the user via the setting menu screen. Such a setting as not to display a quick review after image capturing processing is also able to be set by the user.

In step S315, the system control unit 50 determines whether a predetermined time has elapsed from displaying of the quick review. If it is determined that the predetermined time has elapsed (YES in step S315), the system control unit 50 advances the processing to step S316, and, if not so (NO in step S315), the system control unit 50 advances the processing to step S317.

In step S316, the system control unit 50 ends displaying of the quick review performed in step S314 and transitions to displaying of the image capturing waiting screen, and then advances the processing to step S323. As mentioned in the description of step S314, a time for which to temporarily display an image captured in step S313 as a quick review is able to be optionally set by the user. Such a setting as not to display a quick review on the display unit 28 even after image capturing in step S313 is also able to be set by the user. Thus, the system control unit 50 can be configured to skip steps S314 to S316 and advance the processing from step S313 directly to step S323. Moreover, in a case where an LV image such as that illustrated in FIG. 7C has been being displayed as the image capturing waiting screen before image capturing is performed in step S313, the system control unit 50 returns to displaying of a display screen for an LV image, and, in a case where a list screen for setting contents such as that illustrated in FIG. 8A has been being displayed, the system control unit 50 returns to displaying of a list screen for setting contents.

In step S317, as with step S304, the system control unit 50 determines whether a locking operation has been performed. If it is determined that the locking operation has been performed (YES in step S317), the system control unit 50 advances the processing to step S318, and, if not so (NO in step S317), the system control unit 50 advances the processing to step S319.

In step S318, the system control unit 50 ends displaying the quick review displayed on the display unit 28 in step S314, and then advances the processing to step S305. It is assumable that, in a case where a locking operation has been performed while a captured image is being displayed as a quick review, the user wishes to change the lock setting state of a lock target operation member to perform a next operation. For example, the user may perform image capturing in the state in which a lock target operation member is locked and, after checking a captured image via a quick review, wish to change setting contents such as a shutter speed and an exposure compensation value to re-perform image capturing. In such a case, the user is likely to wish to perform a locking operation (for example, pressing of the lock button 76), unlock a lock target operation member to which a setting item to be changed is allocated, quickly perform changing of setting contents, and perform image capturing. Therefore, control is set in such a manner that, even when a quick review is being displayed on the display unit 28, in a case where a locking operation has been performed, the system control unit 50 ends displaying the quick review in response to pressing and then performs processing corresponding to the locking operation in step S305. With this control set, even if an image is being displayed as a quick review, the user is able to quickly change the lock setting state of a lock target operation member by performing the locking operation, so that operability is high. Moreover, it is possible to reduce the possibility of missing a shutter opportunity.

In step S319, as with step S306, the system control unit 50 determines whether an operation on the lock target operation member has been performed. If it is determined that the operation has been performed (YES in step S319), the system control unit 50 advances the processing to step S320, and, if not so (NO in step S319), the system control unit 50 returns the processing to step S315.

In step S320, as with step S300, the system control unit 50 refers to the non-volatile memory 56 and determines whether the lock flag is "1". If it is determined that the lock flag is "1" (YES in step S320), the system control unit 50 returns the processing to step S315, and, if it is determined that the lock flag is "0" (NO in step S320), the system control unit 50 advances the processing to step S321.

In step S321, the system control unit 50 ends displaying the quick review displayed on the display unit 28 in step S314, and then advances the processing to step S307. Consider a case where a lock target operation member which is not currently locked (is in the unlocked state) has been operated while a captured image is being displayed as a quick review. After checking a captured image via a quick review, the user may wish to change setting contents such as a shutter speed and an exposure compensation value to re-perform image capturing. Therefore, even when a quick review is being displayed on the display unit 28, the system control unit 50 ends displaying the quick review in response to the lock target operation member being operated and then performs display control processing at the time of an operation on the lock target operation member in step S307. With this processing, even if an image is being displayed as a quick review, the user is able to quickly change the setting content of a setting item allocated to the lock target operation member and then proceed to an image capturing operation. On the other hand, in a case where a lock target operation member which is currently locked (is in the locked state) has been operated, the setting content is not changed by the setting change function allocated to the lock target operation member. Therefore, the system control unit 50 continues displaying a quick review.

In step S322, the system control unit 50 determines whether the first shutter switch 62 is kept turned on. If it is determined that the first shutter switch 62 is kept turned on (YES in step S322), the system control unit 50 returns the processing to step S312, and, if not so (NO in step S322), the system control unit 50 advances the processing to step S323.

In step S323, the system control unit 50 determines whether a mode switching operation has been performed. If it is determined that the mode switching operation has been performed (YES in step S323), the system control unit 50 advances the processing to step S324, and, if not so (NO in step S323), the system control unit 50 advances the processing to step S326. The mode switching operation means, for example, pressing of the playback button 79 or the menu button 81. For example, when the playback button 79 is pressed, the system control unit 50 transitions to playback mode processing for playing back a captured image. When the menu button 81 is pressed, the system control unit 50 transitions to displaying of the setting menu screen. Thus, the mode switching operation being performed implies that the user wishes to cause the processing to transition to a mode different from the image capturing mode processing. Since the flowchart of FIG. 3 is implemented in the image capturing mode processing, in a case where the processing has transitioned to, for example, playback mode processing different from the image capturing mode processing, a flowchart different from the flowchart of FIG. 3 is used for control.

In step S324, as with step S300, the system control unit 50 refers to the non-volatile memory 56 and determines whether the lock flag is "1". If it is determined that the lock flag is "1" (YES in step S324), the system control unit 50 advances the processing to step S325, and, if it is determined that the lock flag is "0" (NO in step S324), the system control unit 50 advances the processing to other mode processing (the flowchart of FIG. 6).

In step S325, since the lock flag is "1" in step S324, the system control unit 50 undoes locking of (unlocks) the lock target operation member which is currently locked, and then advances the processing to other mode processing. In a case where the digital camera 100 is in the image capturing waiting state in the image capturing mode processing, while the user is about to perform image capturing, the user has the possibility of, while keeping the image capturing waiting state to quickly perform image capturing, replacing the lens unit 150 or hanging the digital camera 100 over the user's shoulder. Under such a condition, if the lock target operation member is not currently locked, as mentioned above, the lock target operation member may be operated despite the intention of the user, so that the setting content set by the user may be changed without the intention of the user. In a case where the user wishes to quickly perform image capturing with the setting content set by the user, if the setting content is changed without the intention of the user, the user becomes unable to quickly perform image capturing with the desired setting content and thus may miss an image capturing opportunity. To prevent such an issue from occurring, during a period in which the digital camera 100 is in the image capturing waiting state, the system control unit 50 is configured to switch the lock setting state of the lock target operation member in response to a locking operation. On the other hand, in a case where the mode has transitioned to a mode different from the image capturing waiting state (i.e., the image capturing mode processing), it is not necessary to lock the lock target operation member. Specifically, in a case where the mode has transitioned from the image capturing mode processing to the playback mode processing, the user is assumed to wish to play back an image recorded on the recording medium 200. In the playback mode processing, the lock target operation member is used to perform an image feeding or enlargement or reduction operation on a played-back image displayed on the display unit 28. In such a case, even if, as mentioned above, the user hangs the digital camera 100 over the user's shoulder in the state in which the digital camera 100 is in the state of playback mode processing, only images are fed in response to the lock target operation member being operated without the intention of the user, so that the setting content is prevented from changing as in the image capturing mode processing. While, if the setting content changes in the image capturing mode processing without the intention of the user, the user misses an image capturing opportunity, on the other hand, even if image feeding is performed without the intention of the user, the user does not miss an image capturing opportunity. Instead, if the lock target operation member is currently locked, the user is not able to smoothly check images. In a case where the user wishes to perform image capturing when the mode is the playback mode processing, the user is able to cause the mode to quickly transition to the image capturing mode only by performing an operation for causing the mode to transition from the playback mode to the image capturing mode (for example, pressing of the shutter button 61). Moreover, even if the lock target operation member has been operated in the playback mode processing, the processing corresponding to an operation on the lock target operation member becomes not changing of the setting content but different processing, so that the setting content set by the user is not changed. For these reasons, in modes other than the image capturing mode processing, the system control unit 50 is configured to ignore the lock setting state of the lock target operation member (the lock flag) and accept an operation on the lock target operation member.

In step S326, the system control unit 50 determines whether the image capturing waiting state has ended. For example, in a case where the image capturing waiting state has ended due to powering-off of the digital camera 100 (YES in step S326), the system control unit 50 ends the flowchart for image capturing mode processing, and, if not so (NO in step S326), the system control unit 50 returns the processing to step S300.

Figure 7A:
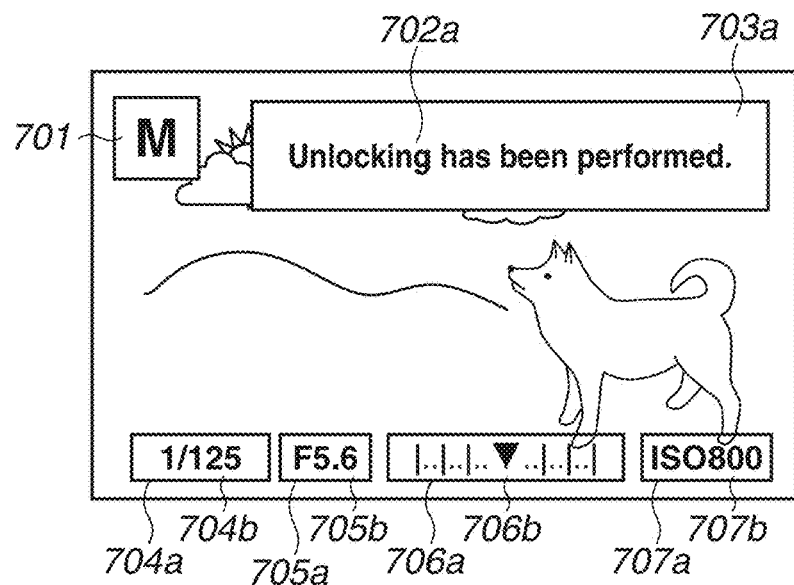
FIGS. 7A, 7B, and 7C are diagrams each illustrating an example of displaying of an image capturing waiting screen showing a live view (LV) image in which simplified information displaying is set.
Figure 7B:
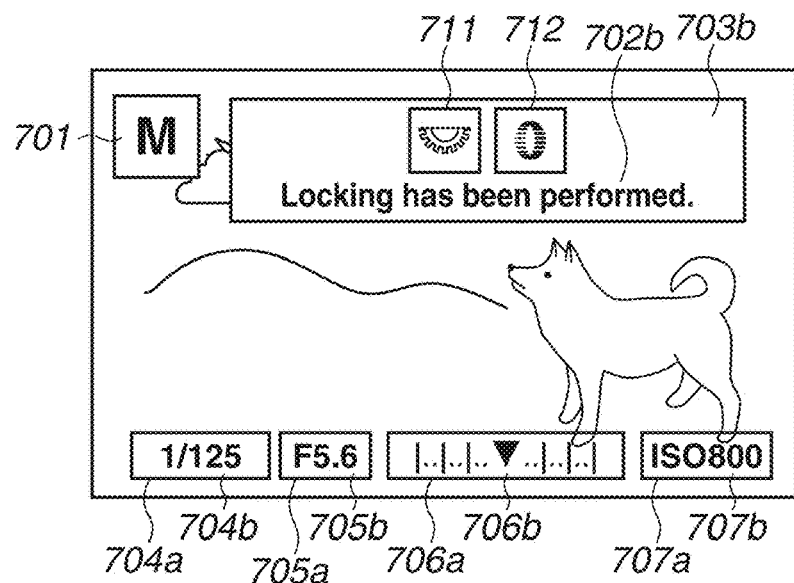
Figure 7C:
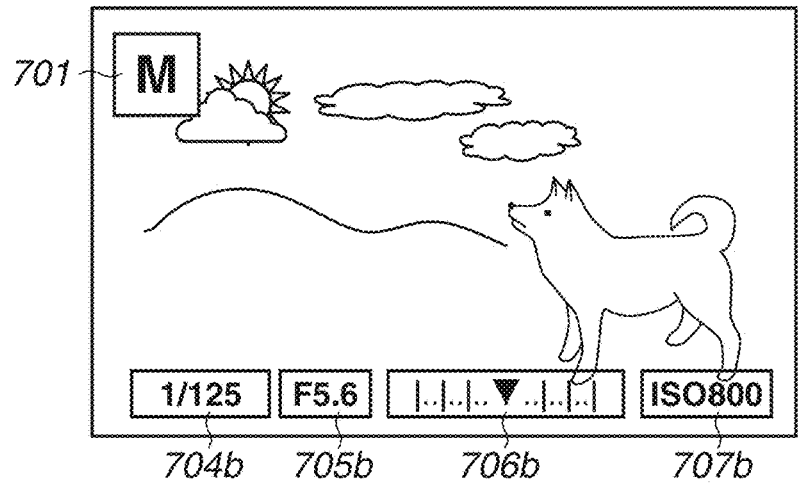

FIG. 4 is a flowchart illustrating the processing corresponding to a locking operation described in step S305 illustrated in FIG. 3. The flowchart of FIG. 4 is started in a case where the result of determination in step S304 illustrated in FIG. 3 is YES, i.e., in a case where a locking operation such as pressing of the lock button 76 has been performed. The flowchart of FIG. 4 is described about display forms taken in a case where a locking operation has been performed, with reference to mainly FIGS. 7A, 7B, and 7C. FIGS. 7A to 7C illustrate simple display examples of information display which is displayed in superimposition on an LV image on the display unit 28. Furthermore, while, in FIG. 4 and FIGS. 7A to 7C, an example in which displaying is performed on the display unit 28 is described, in a case where the display destination is the EVF 29, similar displaying is assumed to be performed on the EVF 29. Each time a switching button (an INFO button) for information display included in the operation unit 70 is pressed, switching of information to be displayed is performed in the order of simple information display, detailed information display, a list screen for setting contents, and no information display (only an LV image). An item 704b to an item 707b are respectively displayed in a region 704a to a region 707a. The item 704b to the item 707b are a shutter speed, an F-value (aperture value), an exposure compensation value, and an ISO sensitivity, respectively. The display order of the item 704b to the item 707b is not limited to this. Moreover, the sizes of the region 704a to the region 707a are configured to vary according to the respective items to be displayed therein. Moreover, in a case where the touch panel 70a has been set as a lock target operation member, if the touch panel 70a is not currently locked, the background color for the display regions for items (regions 704a to 707a) is configured to differ in display form from that of an LV image. Thus, displaying is performed in such a way as to enable readily recognizing that the item 704b to the item 707b are operation targets. If the touch panel 70a is currently locked, the background color for the display regions for items (regions 704a to 707a) is configured not to differ in display form from that of an LV image. Thus, displaying is performed in such a way as to enable readily recognizing that the item 704b to the item 707b are not operation targets but items merely displaying the current setting state. Furthermore, the display form which enables discriminating the display regions for items is not limited to the above-mentioned one but only needs to the one which enables visually recognizing whether the user is able to perform a touch operation on the regions 704a to 707a, and, therefore, can be a display form which enables such a discrimination by displaying only frames of the respective regions.

In step S401, the system control unit 50 determines whether guide displaying for the mode guide is currently performed on the display unit 28. If it is determined that guide displaying for the mode guide is currently performed (YES in step S401), the system control unit 50 advances the processing to step S402, and, if not so (NO in step S401), the system control unit 50 advances the processing to step S403. The guide displaying refers to displaying of a guide which is displayed when the use has switched between various modes by operating the mode selection switch 60. The guide displaying is performed to show a mode obtained after switching performed by a mode selection operation and what is the content of each of various modes. For example, assuming that the user has performed switching from the automatic (AUTO) image capturing mode to the program (P) mode, guide displaying which displays an icon indicating the program mode and the content of the program mode indicating, for example, "You are ready to perform image capturing while setting various functions of the camera." is performed on the display unit 28 for a predetermined time. When the predetermined time (for example, 6 seconds) has elapsed from mode switching, the mode guide becomes automatically hidden. Furthermore, as illustrated in FIG. 7A, the current mode is shown in the display form such as an icon 701 together with a live view image on the display unit 28. In FIG. 7A, the icon 701 is displayed as "M", so that the user is able to visually recognize that the manual mode is currently set.

In step S402, the system control unit 50 ends displaying of the mode guide which has been displayed on the display unit 28, and transitions to displaying of the image capturing waiting screen. It is assumable that, even if the mode guide is being displayed when a locking operation has been performed in step S304 illustrated in FIG. 3, the user wishes to change the lock setting state of a lock target operation member by performing a locking operation. Therefore, even if the mode guide is being displayed, the system control unit 50 ends displaying of the mode guide.

In step S403, the system control unit 50 determines whether the digital camera 100 is in the process of being busy. If it is determined that the digital camera 100 is in the process of being busy (YES in step S403), the system control unit 50 ends the present flowchart, and, if not so (NO in step S403), the system control unit 50 advances the processing to step S404. The case where it is determined that the digital camera 100 is in the process of being busy includes specifically the following cases. For example, there is a case where, when the user is performing continuous image capturing (continuous shooting), the amount of space remaining of the memory 32, which is a work memory used for continuously performing recording of still images or a moving image, becomes insufficient and write processing for images on the recording medium 200 is in progress. Moreover, there is a case where, when the user performs image capturing of a plurality of images (here, for example, three images) and records a special image by causing the image processing unit 24 to combine the three images, synthetic processing for synthesizing a single image from the captured three images is in progress. There is also a case where an image to be recorded on the recording medium 200 is in the process of being generated (developed). In the cases mentioned above, since the system control unit 50 uses a significant amount of memory for internal processing such as image processing, for example, displaying of an LV image on the display unit 28 or playback of an image reproduced from the recording medium 200 is not able to be performed. In the present exemplary embodiment, the digital camera 100 is not equipped with a display unit for always displaying information about, for example, setting contents, other than the EVF 29 and the display unit 28. Therefore, if, during the process of the digital camera 100 being busy, the lock setting state is switched in response to a locking operation, a notification for notifying the user of switching of the lock setting state described below is not able to be displayed. Accordingly, the lock setting state may be switched at a time when the user is unable to recognize such switching, so that confusion may be caused for the user. Therefore, in the present exemplary embodiment, during the process of the digital camera 100 being busy, the system control unit 50 does not accept switching of the lock setting state of an operation member performed by a locking operation.

In step S404, the system control unit 50 refers to the non-volatile memory 56 and determines whether the lock flag set before a locking operation is performed is "1". If it is determined that the lock flag is "1" (the lock target operation member has been in the locked state before a locking operation is performed) (YES in step S404), the system control unit 50 advances the processing to step S405, and, if it is determined that the lock flag is "0" (the lock target operation member has been in the unlocked state before a locking operation is performed) (NO in step S404), the system control unit 50 advances the processing to step S406.

In step S405, the system control unit 50 unlocks the lock target operation member and set the lock flag to "0". Moreover, the system control unit 50 displays a message indicating "Unlocking has been performed." on the display unit 28. In the present exemplary embodiment, the digital camera 100 is not equipped with a display unit for always displaying setting contents, other than the EVF 29 and the display unit 28. Therefore, if a notification is not issued at timing when the lock setting state has been switched by a locking operation, unless the user causes the system control unit 50 to transition to displaying of the setting menu scree and performs checking, the user is not able to check the lock setting state of the lock target operation member. Moreover, since it is presumed that the user has unintentionally performed a locking operation, the system control unit 50 notifies the user of switching of the lock setting state of the lock target operation member performed by a locking operation. FIG. 7A illustrates a display example of such a notification. With regard to the notification content, displaying of a message 702a indicating "Unlocking has been performed." as the notification content is performed in a region 703*a* in superimposition on an LV image displayed on the display unit 28. The size of the region 703*a* can be set to the same size as that of a region 703*b* described below illustrated in FIG. 7B, or can be varied according to the size of the message 702*a*. This enables the user to readily check the current lock setting state of the lock target operation member at timing of a locking operation.

In step S406, the system control unit 50 locks the lock target operation member and sets the lock flag to "1". Moreover, the system control unit 50 displays, as the notification content, both a message indicating "Locking has been performed." and an icon indicating the locked member on the display unit 28. In the present exemplary embodiment, the user is able to optionally set a lock target operation member via the setting menu screen, and is also able to set a plurality of lock target operation members. Therefore, it is difficult for the user to remember which operation member the lock target operation member is, so that it is hard for the user to recognize which operation member has been locked. Therefore, the system control unit 50 displays two notification contents, such as a message 702*b* and icons 711 and 712 illustrated in FIG. 7B, in response to a locking operation (in response to the lock target operation member being locked). This enables the user to recognize which operation member has been locked. In the display example illustrated in FIG. 7B, it will be found from the icons 711 and 712 that the sub-electronic dial 73 and the control ring 83 have entered a locked state. In a case where the lock target operation member has been unlocked in step S405, all of the operation members which are settable via the setting menu screen become able to be operated. Therefore, only a notification of changing of the lock setting state is issued with a message such as that illustrated in FIG. 7A, and it is not necessary to display an icon indicating an operation member. However, even when performing unlocking, the system control unit 50 can display both a message and an icon. Moreover, instead of displaying a message and an icon in step S406, the system control unit 50 can transition to displaying of the setting menu screen for lock target operation members described with reference to FIG. 11A in response to a locking operation and display a message indicating the lock setting state. This enables the user to check or change a member set as a lock target operation member and thus more assuredly recognize the lock setting state. Moreover, the system control unit 50 does not need to wastefully transition to displaying of the setting menu screen to change a lock target operation member. Furthermore, to indicate that the lock target operation member has been locked, the system control unit 50 can be configured to display a LOCK icon (not illustrated) indicating the locked state, which is different from the above-mentioned message 702*b* and icons 711 and 712. The LOCK icon continues being displayed during a period in which the lock target operation member is locked, even if a predetermined time described below in step S407 has elapsed. This enables the user to visually recognize that the lock target operation member is currently locked.

In step S407, the system control unit 50 determines whether a predetermined time has elapsed from the start of displaying of a message or a message and icon displayed on the display unit 28 in step S405 or S406. If it is determined that the predetermined time has elapsed (YES in step S407), the system control unit 50 advances the processing to step S408, and, if not so (NO in step S407), the system control unit 50 advances the processing to step S409. The predetermined time as used here means a time of, for example, about two seconds.

In step S408, the system control unit 50 ends displaying a notification of the lock setting state of the lock target operation member displayed in step S405 or S406. Specifically, the system control unit 50 ends displaying of the message 702*a* and the region 703*a* illustrated in FIG. 7A or the message 702*b*, the region 703*b*, and the icons 711 and 712 illustrated in FIG. 7B, and provides a display such as that illustrated in FIG. 7C. At this time, in a case where, for example, as illustrated in FIGS. 7A and 7B, the system control unit 50 has been displaying a notification of the lock setting state in superimposition on an LV image, the system control unit 50 ends displaying the notification of the lock setting state and continues displaying an LV image on the display unit 28 as illustrated in FIG. 7C. While a case where a notification is displayed in superimposition on an LV image has been described with reference to FIGS. 7A to 7C, in a case where a notification of the lock setting state has been displayed in superimposition on a list screen for setting contents described below with reference to FIG. 8A, the system control unit 50 ends displaying the notification and continues displaying the list screen for setting contents on the display unit 28.

In step S409, as with step S304, the system control unit 50 determines whether a locking operation has been performed. If it is determined that a locking operation has been performed (YES in step S409), the system control unit 50 advances the processing to step S410, and, if not so (NO in step S409), the system control unit 50 ends the flowchart of FIG. 4 and then returns the processing to step S306 illustrated in FIG. 3.

In step S410, as with step S408, the system control unit 50 ends displaying the notification of the lock setting state of the lock target operation member displayed in step S405 or S406. Specifically, the system control unit 50 ends displaying of the message 702*a* and the region 703*a* illustrated in FIG. 7A or the message 702*b*, the region 703*b*, and the icons 711 and 712 illustrated in FIG. 7B. It will be found from the result of determination in step S407 being NO that a locking operation has been performed in the state in which the predetermined time has not yet elapsed from the start of displaying of the lock setting state. In such a case, it is assumable that the user wishes to perform any one of checking of a lock target operation member to be locked when a locking operation has been performed, checking of the lock setting state of the current lock target operation member, and checking of which member is to be locked. Therefore, in a case where a locking operation has been performed at a time when the predetermined time has not yet elapsed from the start of displaying of a notification of the lock setting state, the system control unit 50 quickly ends displaying the notification of the lock setting state and then restarts control associated with the locking operation (performs the flowchart of FIG. 4 from the first).

As mentioned above, in a case where a member has been unlocked in response to a locking operation, as illustrated in FIG. 7A, the system control unit 50 displays a message indicating "Unlocking has been performed." on the display unit 28. In a case where a member has been locked in response to a locking operation, as illustrated in FIG. 7B, the system control unit 50 displays a message indicating "Locking has been performed." and an icon of the locked member on the display unit 28. In a case where the member has entered a locked state, an icon is displayed in addition to a notification using a message, so that the user becomes able to recognize switching of the lock setting state and the lock target operation member as locked. Furthermore, while, in FIGS. 7A and 7B, a display form in which a notification indicating the lock setting state is displayed in superimposition on a part of an LV image in such a way as to prevent the entire LV image from becoming unable to be visually recognized is employed, a display form in which a notification is displayed over the entire LV image (display unit 28) can also be employed.

FIG. 5 is a flowchart illustrating display control processing performed when the lock target operation member has been operated, described in step S307 illustrated in FIG. 3. The flowchart of FIG. 5 is started when the result of determination in step S306 illustrated in FIG. 3 is YES, in other words, when an operation on the lock target operation member has been performed.

In step S501, the system control unit 50 determines whether there is displaying of a notification of the lock setting state on the display unit 28. Specifically, the system control unit 50 determines whether there is displaying of the message 702a or 702b, the icons 711 and 712, and the region 703a or 703b illustrated in FIGS. 7A and 7B. If it is determined that there is displaying of a notification of the lock setting state (YES in step S501), the system control unit 50 advances the processing to step S502, and, if not so (NO in step S501), the system control unit 50 advances the processing to step S503.

In step S502, as with step S408 or S410 illustrated in FIG. 4, the system control unit 50 ends displaying the notification of the lock setting state, and then advances the processing to step S503.

In step S503, the system control unit 50 determines whether the lock flag is "1". If it is determined that the lock flag is "1" (YES in step S503), the system control unit 50 advances the processing to step S504, and, if not so (NO in step S503), the system control unit 50 advances the processing to step S505.

In step S504, the system control unit 50 does not execute a function corresponding to an operation performed on the lock target operation member. Since the result of determination in step S503 is YES, the member which the user has operated in step S306 illustrated in FIG. 3 is currently locked. Therefore, even if an operation on the locked member has been performed by the user, the system control unit 50 disables an operation performed on the member, i.e., does not perform, for example, changing of the setting content of a setting item corresponding to the operation (does not execute a function corresponding to the operation). For example, consider a case where a function of changing the ISO sensitivity has been allocated to the sub-electronic dial 73. In a case where the sub-electronic dial 73 is currently set as a lock target operation member and is currently locked (the lock flag is "1"), even if the sub-electronic dial 73 has been operated, the system control unit 50 does not change the ISO sensitivity.

In step S505, the system control unit 50 enables an operation performed on the lock target operation member. Since the result of determination in step S503 is NO, the user is able to find that the operation member has not been locked in step S306 illustrated in FIG. 3. Therefore, if an operation on the member has been performed by the user, the system control unit 50 enables an operation on the lock target operation member, i.e., performs, for example, changing of the setting content of a setting item corresponding to the operation (executes a function corresponding to the operation). For example, consider a case where a function of changing the ISO sensitivity has been allocated to the sub-electronic dial 73. In a case where the sub-electronic dial 73 is currently set as a lock target operation member and is not currently locked (the lock flag is "0"), the system control unit 50 changes the ISO sensitivity in response to the sub-electronic dial 73 being operated.

In step S506, the system control unit 50 determines whether the screen which is currently displayed on the display unit 28 is a list screen for setting contents. If it is determined that the displayed screen is a list screen for setting contents (YES in step S506), the system control unit 50 advances the processing to step S507, and, if not so (NO in step S506), the system control unit 50 advances the processing to step S511. The list screen for setting contents refers to displaying of a screen displayed as a list of setting contents about image capturing, such as those illustrated in FIGS. 8A to 8D. The list screen for setting contents is one of screens which are able to be switched by an operation on the above-mentioned switching button for information display (for example, an INFO button). Out of the setting items currently displayed in the list screen for setting contents, with regard to items of F-value, shutter speed, and ISO sensitivity, an icon of the operation member is displayed as well as the setting contents in the display region for the setting items, in such a way as to be readily understandable by the user. For example, since a function of changing the shutter speed is currently allocated to the main electronic dial 71, an icon 801a indicating the main electronic dial 71 is displayed together with an item 801b indicating the shutter speed. Since a function of changing the F-value is allocated to the control ring 83, an icon 802a indicating the control ring 83 is displayed together with an item 802b indicating the F-value. In this way, displaying the setting item and the operation member icon while associating them with each other enables the user to recognize by operating which operation member the user is able to change the setting content of which setting item. Displaying the list screen enables the user to check a list of the currently set setting contents in the state in which the user views the display unit 28 while keeping the eye away from the eyepiece unit 16 or check other settings while changing the setting content of a desired setting item by operating the lock target operation member. For example, in the example illustrated in FIG. 8A, the item 800 indicates that the digital camera 100 is currently in the manual mode. In the case of the manual mode, even if the user has operated the main electronic dial 71 indicated by the icon 801a to change the setting content of the item 801b (shutter speed), the setting contents of the other items stay unchanged. For example, in this case, while viewing the setting contents of F-value (item 802b), ISO sensitivity (item 803b), and exposure compensation value, the user adjusts the shutter speed in such a way as to prevent the entire balance of exposure from becoming poor. In the case of the shutter priority (Tv) mode, if the user changes the setting content of the item 801b, there occurs a case where the other setting contents serving as factors for exposure are automatically changed according to such a change. If, in such a case, the list screen for setting contents is displayed, the user is enabled to change the setting content of a desired item while checking the other setting contents, so that a good operability is obtained for the user. Furthermore, in the present exemplary embodiment, the system control unit 50 displays the above-mentioned list screen for setting contents on only the display unit 28. Thus, in a case where the list screen for setting contents is currently set by switching of information display, when eye access is not detected by the eye access detection unit 57, the system control unit 50 displays not an LV image but a list screen for setting contents on the display unit 28. When eye access is detected by the eye access detection unit 57, the system control unit 50 displays an LV image on the EVF 29.

In step S507, the system control unit 50 determines whether what is the function allocated to the member operated in step S306 illustrated in FIG. 3. If it is determined that the function allocated to the operated member is the setting change function for any one of the F-value, shutter speed, ISO sensitivity, and exposure compensation value (SHUTTER SPEED, F-VALUE, ISO SENSITIVITY, AND EXPOSURE COMPENSATION VALUE in step S507), the system control unit 50 advances the processing to step S509, and, if it is determined that one of the others is allocated to the operated member (OTHERS in step S507), the system control unit 50 advances the processing to step S508. The F-value, shutter speed, ISO sensitivity, and exposure compensation value are setting contents which are important for the user to perform image capturing. These are not able to be adjusted by performing, for example, image processing after image capturing and are able to be adjusted only at the time of image capturing, and are, therefore, important setting contents. Therefore, even in a list screen for setting contents illustrated in FIG. 8A, larger display regions are allocated to these setting contents than those allocated to the other setting items. Moreover, for example, in a case where the item allocated to the member operated by the user is the F-value, depending on a mode for image capturing performed by the user, other setting contents may be varied in conjunction with changing of the F-value. Therefore, display regions for setting items considered to be important at the time of image capturing are displayed in larger regions than regions for the other setting contents, thus enabling the user to readily visually recognize the important setting items.

In step S508, the system control unit 50 determines whether, in the list screen for setting contents, the size of a display region for the setting content changeable by the operation member operated by in step S306 illustrated in FIG. 3 is greater than or equal to a predetermined value. For example, in a case where any one of the conditions of the area of the display region being greater than or equal to a predetermined area, the ratio of the area of the display region to the entire screen being greater than or equal to a predetermined ratio, the width of the display region being greater than or equal to a predetermined value, and the height of the display region being greater than or equal to a predetermined value is satisfied, the result of determination in step S508 is YES. If it is determined that the size of a display region is greater than or equal to the predetermined value (YES in step S508), the system control unit 50 advances the processing to step S509, and, if not so (NO in step S508), the system control unit 50 advances the processing to step S510. As determined in step S507, the function allocated to the operated member is the setting change function for any one of setting items of low importance other than the F-value, shutter speed, ISO sensitivity, and exposure compensation value. With regard to these setting items, the system control unit 50 switches between performing processing in step S510 and performing processing in step S509, described below, based on the size of the display region for the setting item.

In step S509, the system control unit 50 provides a display indicating that the locked state is currently set in the display region for the setting item. For example, suppose that the member operated in step S306 illustrated in FIG. 3 is the main electronic dial 71 and the shutter speed is allocated to the main electronic dial 71. Since the result of determination in step S503 is YES, the main electronic dial 71 is in the locked state. Accordingly, the system control unit 50 provides a display indicating that the locked state is currently set in the display region for the shutter speed. FIG. 8D illustrates a display example provided at this time. A character string indicating "LOCK" is displayed in the display region 801 used for indicating the setting of the shutter speed, thus indicating that the locked state is currently set. As mentioned in step S508, the shutter speed is an item which is of high importance in performing image capturing, so that the display region for the shutter speed is large. Therefore, the display region has a size sufficient to display "LOCK" such as that illustrated in FIG. 8D, so that the character string indicating "LOCK" is able to be displayed in the display region for such a setting item. Moreover, in a case where, in the state in which the operated lock target operation member is in the unlocked state, an item for the change function allocated to the lock target operation member is an exposure factor or the size of the display region is greater than or equal to the predetermined value, the changed content for the setting is displayed in the display region for the item (described below in step S514). Therefore, performing displaying of the character string "LOCK" in a position which the user will view when the locked state is not set more enables the user to readily recognize that the operated lock target operation member is currently locked.

In step S510, the system control unit 50 displays the display region for a setting item corresponding to the function allocated to the operated lock target operation member in the list screen in such a way as to be able to be discriminated from the other setting items. In addition to that, the system control unit 50 displays a character string "LOCK", which indicates that the locked state is set, in a display region 830 at the bottom of the screen. FIG. 8E illustrates a display example provided at this time. As described below in step S515, the region 830 is a region used in common for displaying setting candidates for setting items other than the shutter speed, F-value, ISO sensitivity, and exposure compensation value. The display regions for setting items other than the exposure factors (the shutter speed, F-value, ISO sensitivity, and exposure compensation value) in the list screen are small. Therefore, a character string 814 indicating "LOCK" is not able to be displayed in the region in which the setting content for the allocated item is displayed. Since, even if the character string 814 is able to be displayed in that region, the character string 814 would be displayed in small characters, the user may be unable to visually recognize the character string 814. Therefore, the system control unit 50 displays the character string 814 in a region 830, which is larger than the display region (for example, a region 811) for a setting item allocated to the operated lock target operation member. Additionally, since the character string 814 is displayed at a position different from a position which is assumed to be currently viewed by the user, the user may be unable to recognize the character string 814. If, since the operation member is in the locked state, the setting content does not change and the character string 814 is not able to be visually recognized, operability is low. Therefore, to cause the display position of the character string 814 to be readily visually recognized, the system control unit 50 provides a display form such as that illustrated in FIG. 8E. For example, in a case where the item allocated to the operated operation member is white balance, the system control unit 50 causes the entire list screen for setting contents excluding the region for displaying the setting state of white balance to be grayed out, so that the region 811 and the region 830 are emphasized (made conspicuous). Moreover, the system control unit 50 displays the character string 814 in the region 830. This enables the user to recognize the display region (region 811) for the item allocated to the member operated by the user and recognize that the member is currently locked. Likewise, as illustrated in FIG. 8F, in a case where the operation member to which the setting change function for the AF mode has been allocated is currently locked and has been operated, the system control unit 50 causes the list screen excluding a display region 816 for the AF mode to be grayed out and displays the character string 814 in the region 830. Thus, in a case where display regions other than those for the exposure factors are small, even if the respective functions allocated to the operated lock target operation members are different, the system control unit 50 displays the character string 814 in the region 830, which is a region used in common. Performing such displaying enables the user to visually recognize an item allocated to the operated lock target operation member and recognize that the operated lock target operation member is currently locked. With this control, the user becomes able to readily shift to a next operation of, for example, performing unlocking or operating a different lock target operation member, so that operability is good. Furthermore, while an example in which the list screen for setting contents excluding the display region for a target item is grayed out has been described, instead of the method of being grayed out, another display method can be employed as long as it uses a display form which makes the display region for a target item discriminable.

On the other hand, step S511 is performed in a case where, instead of the list screen for setting contents, an LV image and information about the setting content have been being displayed as illustrated in FIGS. 7A to 7C. In step S511, the system control unit 50 varies the display form of the display region for a setting content corresponding to the operated lock target operation member. Consider a case where, in the state illustrated in FIG. 7C, the user has operated the sub-electronic dial 73 when the sub-electronic dial 73 is in the locked state. Since the setting change function for ISO sensitivity is allocated to the sub-electronic dial 73, the system control unit 50 displays a character string "LOCK", which indicates that the locked state is set, in place of the setting content for ISO sensitivity in the region 707a, which is the display region for ISO sensitivity, in response to an operation performed by the user.

On the other hand, in a case where the locked state is not set, in step S512, as with step S506, the system control unit 50 determines whether the list screen for setting contents is currently displayed on the display unit 28. If it is determined that the list screen for setting contents is currently displayed (YES in step S512), the system control unit 50 advances the processing to step S513, and, if not so (NO in step S512), the system control unit 50 advances the processing to step S516.

In step S513, as with step S507, the system control unit 50 performs determination of an item allocated to the member operated in step S306 illustrated in FIG. 3. If it is determined that the item allocated to the operated member is any one of the shifter speed, F-value, ISO sensitivity, and exposure compensation value (SHUTTER SPEED, F-VALUE, ISO SENSITIVITY, AND EXPOSURE COMPENSATION VALUE in step S513), the system control unit 50 advances the processing to step S514, and, if not so (OTHERS in step S513), the system control unit 50 advances the processing to step S515.

In step S514, the system control unit 50 changes displaying of the item allocated to the operated member in such a ways as to indicate the setting content (setting value) changed in step S505 in the display region for the setting item. For example, in a case where the member operated in step S306 illustrated in FIG. 3 is the sub-electronic dial 73, the system control unit 50 updates displaying of the item 803b displayed in the region 803 used for displaying the ISO sensitivity illustrated in FIG. 8A (for example, changes displaying from "AUTO" to "100").

In step S515, the system control unit 50 displays a setting candidate for the setting item allocated to the operated lock target operation member in the region 830 and displays the setting content changed in step S505 in a discriminable manner. For example, in a case where white balance is allocated to the M-Fn bar 82, in response to an operation on the M-Fn bar 82, a cursor is displayed in the region 811 as illustrated in FIG. 8B, and a plurality of candidates selectable as the setting content for white balance is displayed in the region 830. In the example illustrated in FIG. 8B, a cursor is put on a candidate 812 (AWB), thus enabling finding that the current setting content is AWB. When, starting with this state, the user operates the M-Fn bar 82, moves a cursor to a candidate 813, and presses a select (OK) button or waits for the elapse of a predetermined time with the cursor kept displayed at the position of the candidate 813, a setting content (electronic flash) indicated by the candidate 813 is set. At the same time, an icon indicating electronic flash is displayed (changed) in the region 811. Moreover, in a case where the switching function for AF mode is allocated to the M-Fn bar 82, as illustrated in FIG. 8C, a cursor is displayed in a region 816 indicating an AF method, thus enabling founding that the setting item to be changed in response to an operation is AF mode. Moreover, a candidate 817 indicating "ONE SHOT" and a candidate 818 indicating "SERVO", which are candidate items for AF mode, are displayed in the region 830. Thus, even if the function allocated to the lock target operation member is the change function for a different setting item, in a case where the setting item is an item other than the exposure factors, the system control unit 50 displays setting candidates in the region 830. In this way, in the case of other than the exposure factors or in a case where the size of a display region is less than the predetermined value, the system control unit 50 displays setting candidates in the region 830, which is a region used in common.

Step S516 is performed in a case where, instead of the list screen for setting contents, an LV image has been being displayed. In step S516, the system control unit 50 performs displaying and changing of the setting content in the display region for the setting item changed in step S505. Specifically, in a case where a target operation member to which the setting change function for shutter speed (item 704b) illustrated in FIG. 7A has been operated, changing of the setting content is performed in the display region (region 704a) in which the shutter speed is displayed.

In step S517, the system control unit 50 determines whether a predetermined time has elapsed from the start of displaying of the character string "LOCK" displayed in step S509, S510, or S511 or the start of displaying of candidates for the setting content displayed in step S514, S515, or S516. If it is determined that the predetermined time has elapsed (YES in step S517), the system control unit 50 advances the processing to step S518, and, if not so (NO in step S517), the system control unit 50 advances the processing to step S519. While the predetermined time as used herein is about one second, the predetermined time can be configured to be optionally set by the user, or the time for displaying can be configured to be variable according to the content, such as shortening the display time for displaying the character string "LOCK" or lengthening the display time for displaying candidates for the setting content.

In step S518, the system control unit 50 ends displaying of the character string "LOCK" displayed in step S509, S510, or S511 or displaying of candidates for the setting content displayed in step S514, S515, or S516, and then advances the processing to step S308 illustrated in FIG. 3.

In step S519, as with step S304 illustrated in FIG. 3 and step S409 illustrated in FIG. 4, the system control unit 50 determines whether a locking operation has been performed. If it is determined that a locking operation has been performed (YES in step S519), the system control unit 50 advances the processing to step S521, and, if not so (NO in step S519), the system control unit 50 advances the processing to step S520.

In step S520, as with step S518, the system control unit 50 ends displaying, and then returns the processing to step S305 illustrated in FIG. 3 (starts the flowchart of FIG. 4).

In step S521, as with step S306 illustrated in FIG. 3, the system control unit 50 determines whether an operation on the lock target operation member has been performed. If it is determined that the operation has been performed (YES in step S521), the system control unit 50 advances the processing to step S522, and, if not so (NO in step S521), the system control unit 50 returns the processing to step S517.

In step S522, as with steps S518 and S520, the system control unit 50 ends displaying, and then returns the processing to step S307 illustrated in FIG. 3 (starts the flowchart of FIG. 5).

Figure 8A:
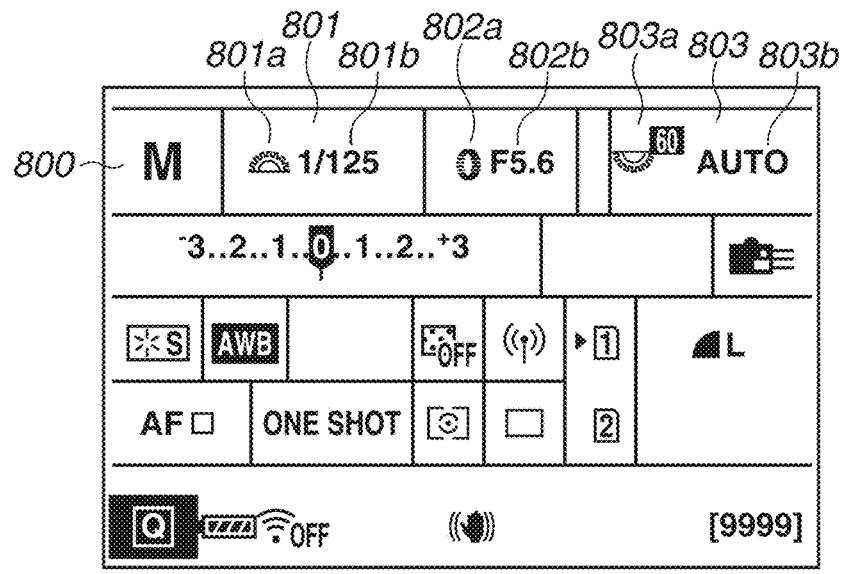
FIGS. 8A, 8B, 8C, 8D, 8E, and 8F are diagrams each illustrating an example of displaying of an image capturing waiting screen not showing an LV image in which a list screen for setting contents is set.
Figure 8B:
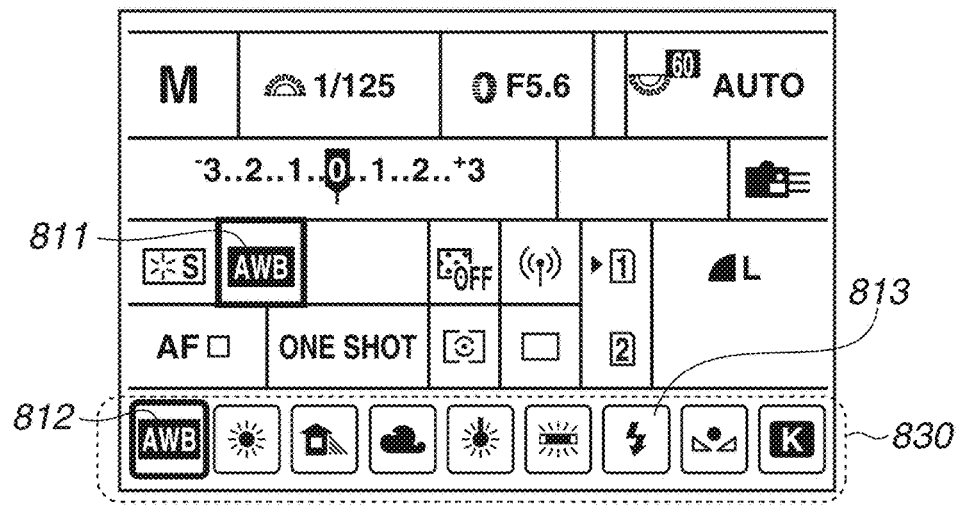
Figure 8C:
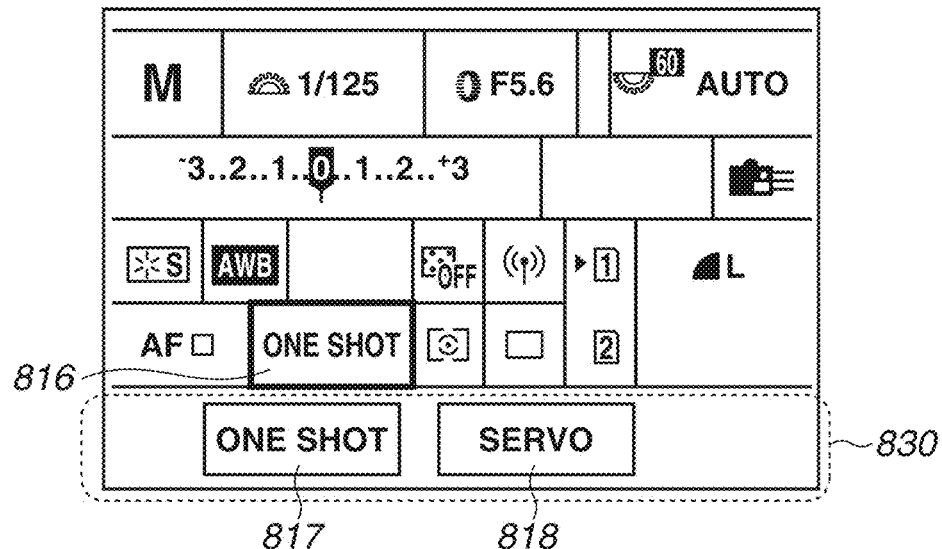
Figure 8D:
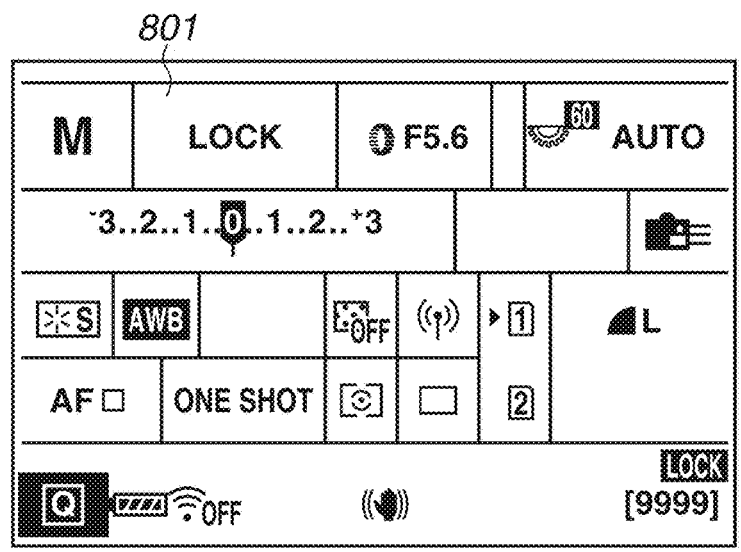
Figure 8E:
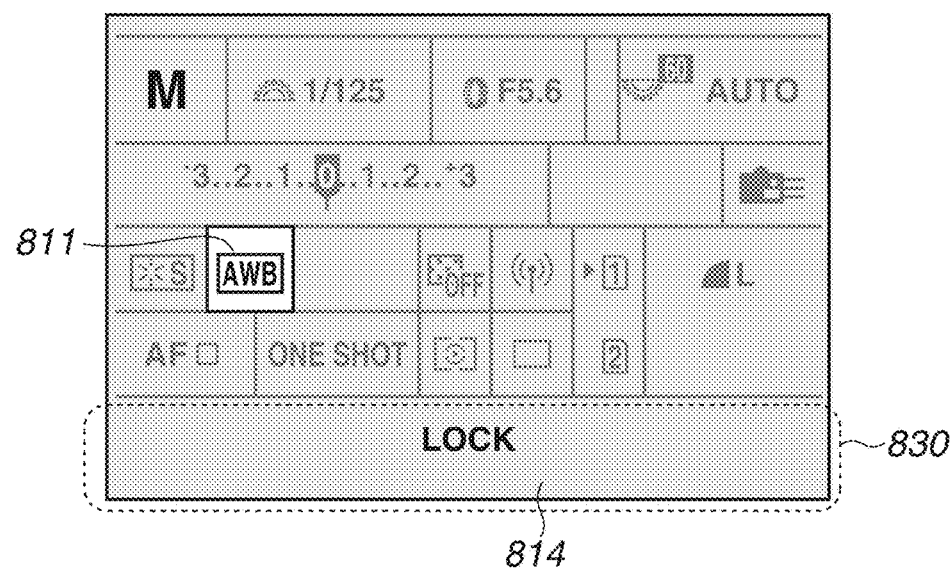
Figure 8F:
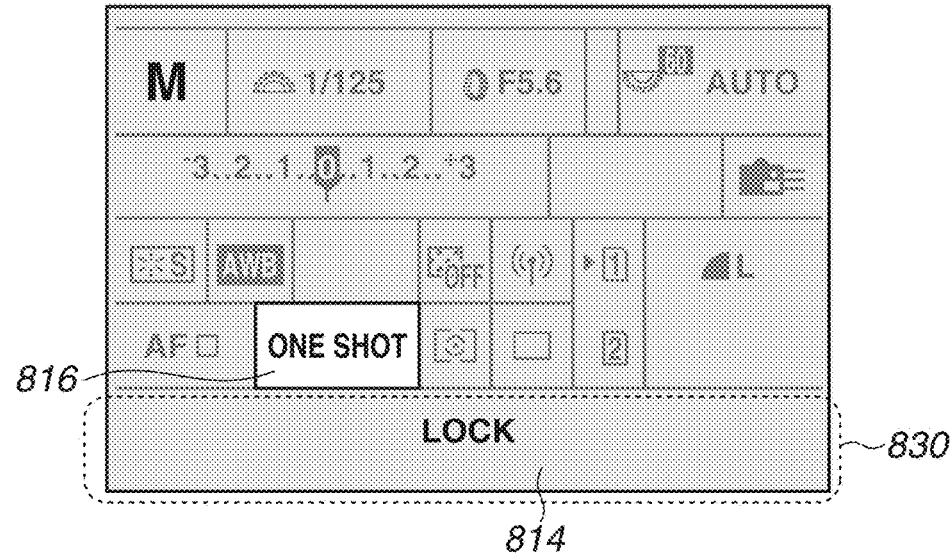

As mentioned above, if, when the list screen for setting contents such as that illustrated in FIG. 8A is being displayed on the display unit 28, the lock target operation member is operated in the locked state, the display position of a notification indicating that the lock target operation member is currently locked is varied according to conditions. Specifically, the display position of a notification indicating that the lock target operation member is currently locked is varied according to the type of a setting item corresponding to the operation member (whether the type is an exposure factor) or the size of a display region used for displaying such an item. As illustrated in FIG. 8B, in a case where an item corresponding to the operation member operated in the unlocked state is other than the items for exposure factors, the system control unit 50 displays a setting change candidate group in a common region different from the display region for the setting item. In a case where the operation member is in the locked state, as illustrated in FIG. 8E, the system control unit 50 emphasizes displaying of the display region for an item corresponding to the operated operation member, makes the other regions difficult to visually recognize, and displays a notification indicating that the operation member is currently locked in the common region. Performing such displaying, i.e., even with regard to an item of not so high importance with respect to image capturing, other than the exposure factor items, displaying a region used for displaying the setting item in a discriminable manner, enables the user to visually recognize an item corresponding to the operation member set in the locked state. Additionally, providing a display indicating that locking is set at a position in which a setting change candidate group is displayed enables the user to recognize that locking is set by viewing the same position as a common region which the user would view when locking is not set, thus attaining understandability.

Moreover, as illustrated in FIG. 8D, in a case where the item corresponding to the operated member is an item concerning exposure factors, the setting content is changed in the display region for setting item of the corresponding item, and, if the locked state is set, a display indicating that locking is set is provided in the same display region. In the case of an item concerning exposure factors of high importance, this enables the user to recognize that locking is set by viewing the same position as a display region for setting item which the user would view when locking is not set, thus attaining understandability. Additionally, the user is enabled to change the setting content concerning an exposure factor while checking the setting content of another exposure factor which is displayed nearby in association with changing of the setting content concerning the exposure factor.

Performing control in this way enables the user to readily discriminate whether an operation member is currently locked or which setting item is unable to be changed due to locking irrespective of sizes of display regions for setting items. Furthermore, in the present exemplary embodiment, the system control unit 50 can skip step S508 and advance the processing from step S507 directly to step S509 or S510. Thus, the system control unit 50 can perform determination with only items allocated to the respective members irrespective of sizes of display regions in the list screen.

Figure 9A:
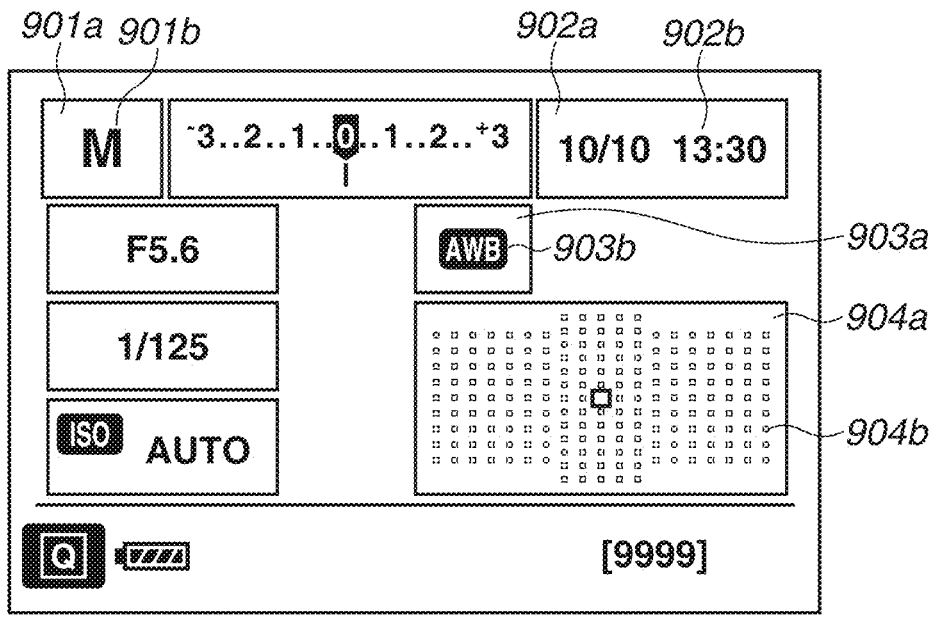
FIGS. 9A and 9B are diagrams each illustrating another example of a list screen for setting contents.
Figure 9B:
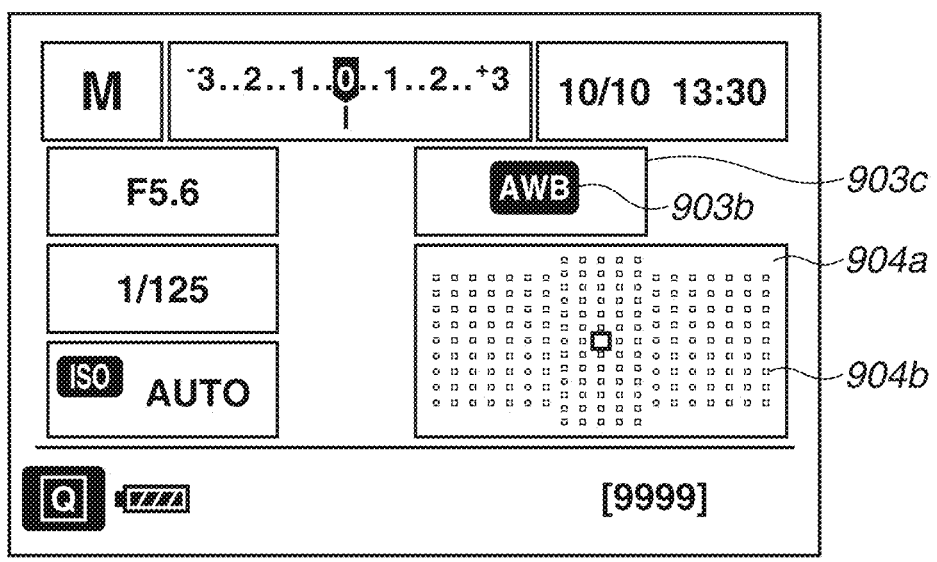

FIGS. 9A and 9B illustrate display examples of list screens, for which the user is able to optionally performing movement or changing of size, as other examples serving as alternatives to the list screens illustrated in FIGS. 8A to 8F. For example, supposing that the size of a region 901a for an item 901b indicating manual mode is a minimum unit (one frame), the size of a region 902a for an item 902b indicating the date and time uses two frames. The size of a region 903a for an item 903b indicating the setting of white balance uses one frame, and the size of a region 904a for an item 904b indicating the details of the AF method uses six frames (two rows×three columns). In this way, with regard to a list screen for setting contents, the user is able to optionally change the display position and the size of a display region. Furthermore, specifically, one frame, which is a minimum unit, is assumed to be a size of 110 pixels in height×280 pixels in width. In a case where the size of a display region is able to be changed for each setting item, the position used for displaying a notification indicating that locking is set can be varied based on the size of a display region used for displaying a setting item irrespective of types of setting items. Thus, the system control unit 50 can switch between performing processing in step S509 and performing processing in step S510 based on processing in step S508 without performing determination in step S507 described above. In this example, the display region is able to be enlarged even with regard to items other than the above-mentioned exposure factors, so that the display region enlarging (the area widening) enables a notification of the lock setting state of a member to be displayed in the display region for a setting item. Furthermore, the predetermined value as used herein is assumed to be a minimum unit (one frame). In the present exemplary embodiment, as long as the display region uses two frames, displaying of the character string "LOCK" is able to be performed.

Figure 6:
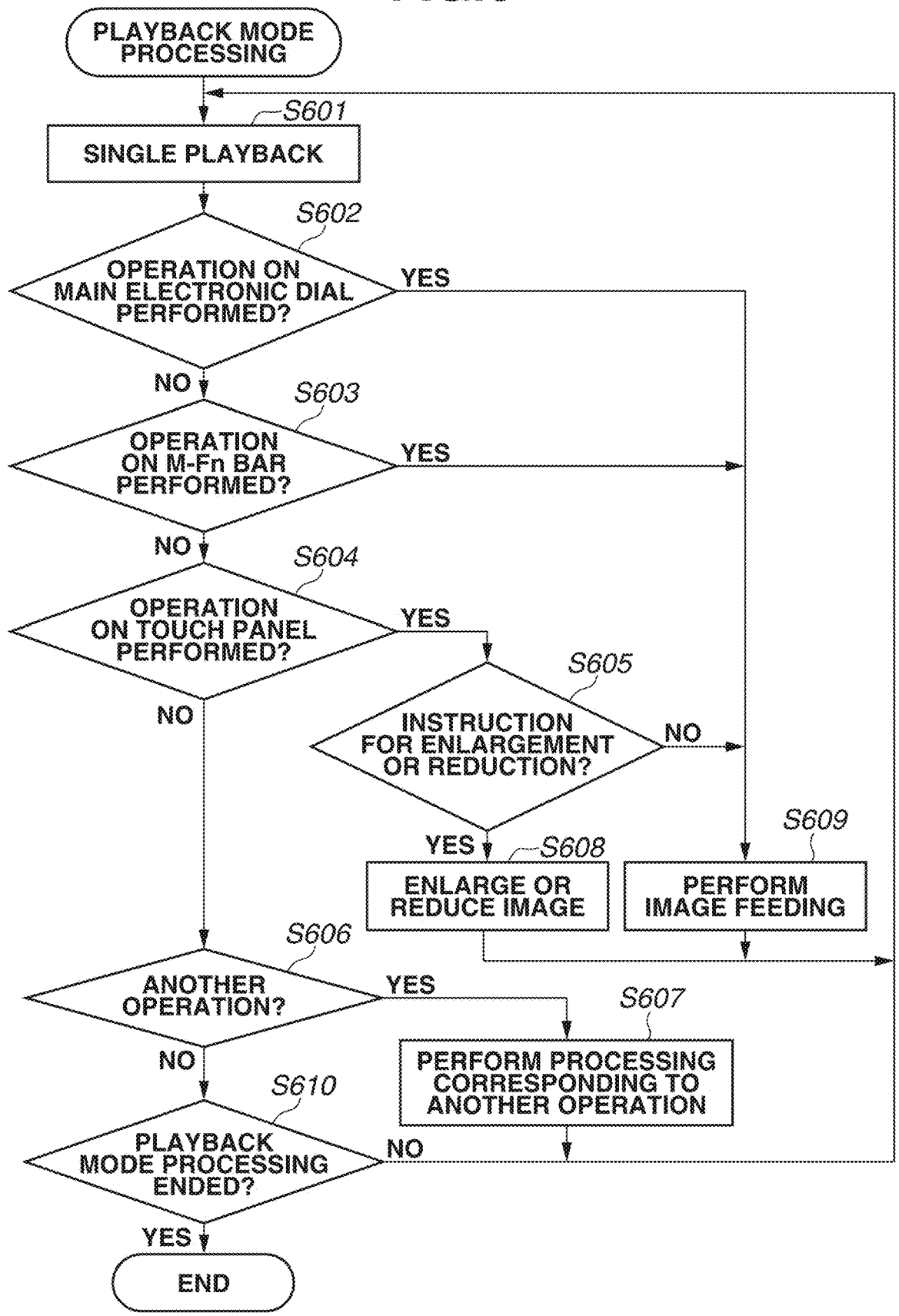
FIG. 6 is a flowchart illustrating playback mode processing.

FIG. 6 is a flowchart illustrating processing which is performed when the processing has transitioned to other mode processing following step S325 illustrated in FIG. 3. Here, a flowchart for playback mode processing is described as an example of the other mode processing. This control processing is implemented by the system control unit 50 loading a program stored in the non-volatile memory 56 onto the system memory 52 and executing the program.

In step S601, the system control unit 50 performs single playback. The single playback refers to displaying, on the display unit 28 at the same size without enlargement, only one image out of the images recorded on the recording medium 200.

In step S602, the system control unit 50 determines whether an operation on the main electronic dial 71 has been performed. If it is determined that the operation has been performed (YES in step S602), the system control unit 50 advances the processing to step S609, and, if not so (NO in step S602), the system control unit 50 advances the processing to step S603. In the playback mode processing, images to be displayed on the display unit 28 are fed one by one in response to an operation on the main electronic dial 71 (image feeding).

In step S603, the system control unit 50 determines whether an operation on the M-Fn bar 82 has been performed. If it is determined that an operation on the M-Fn bar 82 has been performed (YES in step S603), the system control unit 50 advances the processing to step S609, and, if not so (NO in step S603), the system control unit 50 advances the processing to step S604. Image feeding is also performed in response to an operation on the M-Fn bar 82, as with an operation on the main electronic dial 71. The M-Fn bar 82 includes, at the right end and left end thereof, operation portions on which a tap operation and a long-touch operation are able to be performed. A tap operation being performed at the right or left end enables feeding images one by one, and a long-touch operation being performed at the right or left end enables continuously performing image feeding one by one.

In step S604, the system control unit 50 determines whether an operation on the touch panel 70a has been performed. If it is determined that an operation on the touch panel 70a has been performed (YES in step S604), the system control unit 50 advances the processing to step S605, and, if not so (NO in step S604), the system control unit 50 advances the processing to step S606. An operation on the touch panel 70a not only can be used for image feeding as with an operation on the main electronic dial 71 or the M-Fn bar 82 but also can be used to enlarge or reduce an image in response to a pinch-in or pinch-out operation on the touch panel 70a.

In step S605, the system control unit 50 determines whether the touch panel operation determined in step S604 is an instruction for enlargement or reduction. If it is determined that an instruction for enlargement or reduction has been issued (YES in step S605), the system control unit 50 advances the processing to step S608, and, if not so (here, a case where a touch-move operation for the left or right direction has been performed is assumed) (NO in step S605), the system control unit 50 advances the processing to step S609. The instruction for enlargement or reduction to the touch panel 70a refers to a pinch-in or pinch-out operation on the touch panel 70a.

In step S606, the system control unit 50 determines whether another operation has been performed. If it is determined that another operation has been performed (YES in step S606), the system control unit 50 advances the processing to step S607, and, if not so (NO in step S606), the system control unit 50 advances the processing to step S610.

In step S607, the system control unit 50 performs processing corresponding to such another operation. For example, the system control unit 50 can display a setting menu screen and perform various settings or can delete an image which is currently displayed in response to pressing of the deletion button 78.

In step S608, the system control unit 50 performs enlargement or reduction of an image which is currently displayed.

In step S609, the system control unit 50 performs image feeding for images to be played back (switching to another image).

In step S610, the system control unit 50 determines whether the playback mode processing has ended. If it is determined that the playback mode processing has ended (YES in step S610), the system control unit 50 ends the flowchart of FIG. 6, and, if not so (NO in step S610), the system control unit 50 returns the processing to step S601. Ending of the playback mode processing refers to transitioning to the image capturing waiting state in response to pressing of the playback button 79 or the shutter button 61 or powering off the digital camera 100.

In this way, in the present exemplary embodiment, irrespective of the lock setting state, the allocation function in the playback mode is performed in response to an operation on a lock target operation member, such as the main electronic dial 71, the touch panel 70a, or the M-Fn bar 82, being performed.

<Description of Operation Member to which Lock Switching Function is Able to be Allocated>

Out of operation members other than the locking operation member (lock button) 76, an operation member which is settable as an operation member usable to perform the above-mentioned locking operation (a switching operation for switching between locking and unlocking) is described. In the present exemplary embodiment, the operation member which is settable as an operation member usable to perform the locking operation, i.e., an operation member to which the lock switching function is able to be allocated, is limited to only the deletion button 78 out of the operation unit 70. This is because the deletion button 78 is an operation member which the user is unlikely to accidentally operate as compared with the other operation members.

The lock switching function is a function which should be especially prevented from being executed by mistake. If the lock switching function is executed by mistake, although the user has intended to perform locking, unlocking may be performed, so that, for example, an unintended setting change may be performed. In fact, if, although locking has been performed to prevent an unintended setting change from being performed, unlocking is accidentally performed and an unintended setting change is performed, the intended aim of performing locking is not able to be achieved and that is putting the cart before the horse. Conversely, if switching between locking and unlocking is performed by mistake and, although the user has intended to perform unlocking, locking is accidentally performed, a setting change may be performed even in a case where the user intends to perform a setting change adapted for a subject to perform image capturing, so that failed image capturing or missing of an image capturing opportunity may be incurred. Thus, disadvantages caused by the lock switching function being performed by mistake are large, so that the lock switching function is a function which should be especially prevented from being erroneously operated.

Figure 11B:
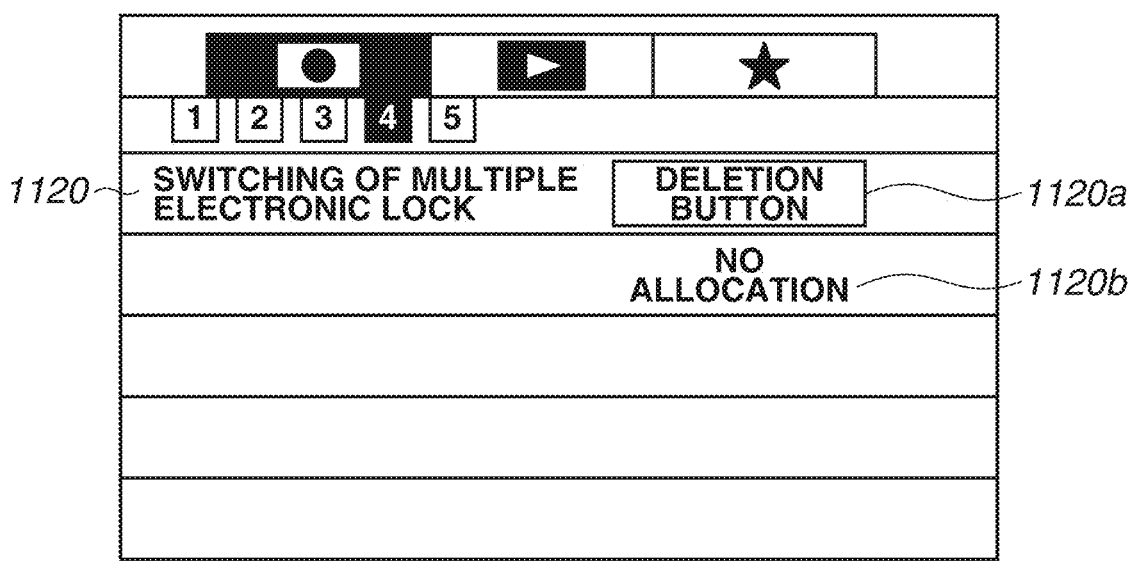

FIG. 11B illustrates a display example of a setting screen used for setting an operation member to which to allocate the lock switching function. With respect to a setting item 1120 for setting an operation member to which to allocate the lock switching function, two options, i.e., an option 1120a ("deletion button") and an option 1120b ("no allocation"), are displayed, so that the user is allowed to select any one of the options to perform setting. Thus, a member which the user is able to select as an operation member to which to allocate the lock switching function is only the deletion button 78.

The deletion button 78 being configured in such a way as to reduce the possibility of being operated by mistake as compared with the other operation members is described with reference to FIGS. 10A, 10B, and 10C.

Figure 10A:
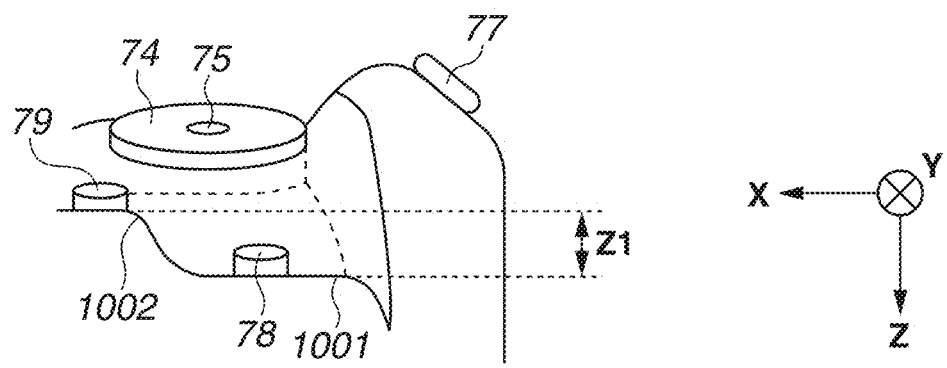
FIGS. 10A, 10B, and 10C are diagrams used to explain a deletion button of the digital camera.

FIG. 10A is an enlarged appearance diagram illustrating the vicinity of the deletion button 78 as viewed from the bottom side of the digital camera 100. The deletion button 78 is located on a plane surface 1001 which is somewhat recessed included in the back surface (a surface opposite to the subject side for image capturing) of the digital camera 100. In the present exemplary embodiment, an operation member which is located on the plane surface 1001 is only the deletion button 78. On the other hand, the playback button 79, the arrow keys 74, and the SET button 75 are located on a plane surface 1002 included in the back surface of the digital camera 100. The plane surface 1001 is lower than the plane surface 1002 by a distance Z1 along the front-back direction (the Z-axis direction illustrated in FIG. 10A). Therefore, even if the user tries to press the deletion button 78 with use of an operation element having a large area, the pressing operation is hindered by the plane surface 1002, so that the deletion button 78 is not able to be pressed. Accordingly, the deletion button 78 is not able to be pressed unless being consciously operated with a fingertip, and is, therefore, unlikely to be operated by mistake.

Figure 10B:
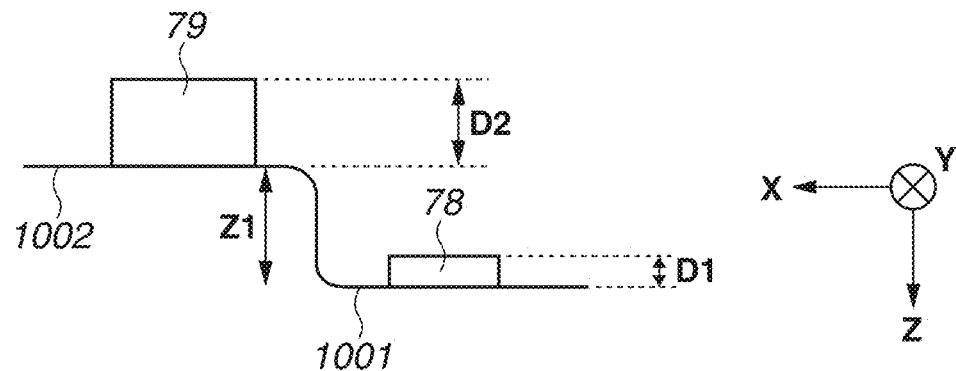

FIG. 10B is an enlarged appearance diagram illustrating the vicinity of the deletion button 78 as viewed from the bottom side of the digital camera 100, and is a schematic diagram obtained by further enlarging and simplifying the diagram of FIG. 10A. While the playback button 79 protrudes from the plane surface 1002 by a height D2, the deletion button 78 protrudes from the plane surface 1001 only by a height D1, which is lower than the height D2. Thus, the height D1 is less than the height D2. This is also a cause of the deletion button 78 being difficult to press as compared with the other operation members such as the playback button 79. The deletion button 78 can be configured to have the protruding height D1 set to zero and be required to be pressed up to a position lower than the plane surface 1001. With this configuration employed, unless being pressed with a fingertip held up, the deletion button 78 is not able to be pressed up to a position lower than the plane surface 1001, so that it is possible to more reduce the possibility that the deletion button 78 may be pressed with an unintended operation.

Furthermore, in a case where the lock switching function has been allocated to the deletion button 78, in the case of the image capturing mode, the lock switching function is executed in response to pressing of the deletion button 78 (being received as a locking operation). On the other hand, even if the lock switching function is allocated to the deletion button 78, in a case where the deletion button 78 has been pressed during the playback mode, the lock switching function is not executed and processing for deleting an image (processing for deleting an image file from the recording medium 200 or processing for displaying a screen for inquiring whether to delete an image) is performed. Deletion of an image may lead to unintentional missing of the image if being executed by mistake, and is, therefore, processing which should be especially prevented from being erroneously operated. In this way, the deletion function, which should be especially prevented from being erroneously operated in the playback mode, and the lock switching function, which should be especially prevented from being erroneously operated in the image capturing mode, are configured to be able to be applied to the same operation member (deletion button 78). This makes it unnecessary to provide two operation members which are configured to be prevented from being erroneously operated with respect to the respective functions. Thus, it is possible to efficiently prevent erroneous operations on two functions without incurring an increase in operation members.

Figure 10C:
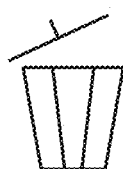

FIG. 10C is a schematic diagram illustrating a trash box mark. The trash box mark, which resembles a trash box, is printed on the operation surface of the deletion button 78 or in the vicinity of the deletion button 78. When viewing the trash box mark, the user is able to recognize that the deletion button 78 is an operation member used to perform image deletion. In other words, the trash box mark is able to cause the user to recognize that the deletion button 78 is an operation member to which attention should be especially paid. This enables more reducing the possibility of the deletion button 78 being carelessly operated.

Furthermore, the lock button 76, to which the lock switching function is naturally allocated, and the deletion button 78, to which the lock switching function is able to be allocated, are located at positions where an operation by the finger (thumb) of the hand which grips the grip portion 90 is able to be performed. This is because, in the camera holding state at the time of image capturing waiting in which, for example, the left hand supports the lens unit 150 (interchangeable lens) and the right hand grips the grip portion 90, a switching operation for locking and unlocking is enabled to be quickly performed. Such a method for use is supposed that the user carries the camera while setting the camera to a locked state to prevent an erroneous operation, holds the camera (sets the camera to the above-mentioned holding state) at the time when finding a subject of which the user wants to perform image capturing, performs unlocking, changes settings in conformance with the subject, and then performs image capturing. In the supposed method for use, the lock switching function is required to be able to be quickly executed without cancellation of the above-mentioned camera holding state. Therefore, the lock button 76 and the deletion button 78 are located in the manner described above. Conversely, if the lock switching function is allocated to an operation member located at a position such as that of the menu button 81 at the left side end of the back surface of the digital camera 100, the user is not able to perform an operation unless the user once cancels the above-mentioned ordinary camera holding state set at the time of image capturing waiting and then changes the way of holding the camera. During a period while changing the way of holding the camera, the user may miss an image capturing opportunity. Accordingly, in the present exemplary embodiment, an operation member located at a position such as that of the menu button 81 is not set as an operation member to which the lock switching function is able to be allocated.

Furthermore, while, in the present exemplary embodiment, an example in which an operation member to which the lock switching function is able to be allocated is restricted to the deletion button 78 has been described, the present exemplary embodiment is not limited to this. As described with reference to FIG. 10A, the lock switching function can be configured to be able to be allocated to an operation member different from the deletion button 78 (i.e., an operation member the allocated function of which in the playback mode is not image deletion) as long as it is an operation member located on a surface lower than a surface on which the other operation members are located. Moreover, as described with reference to FIG. 10B, the lock switching function can be configured to be able to be allocated to an operation member different from the deletion button 78 (i.e., an operation member the allocated function of which in the playback mode is not image deletion) as long as it is an operation member the height of the protrusion of which is lower than the heights of the other operation members.

An example of a configuration location of the deletion button 78 different from the configuration location of the deletion button 78 described above with reference to FIGS. 10A and 10B is described with reference to FIGS. 12A and 12B.

Figure 12A:
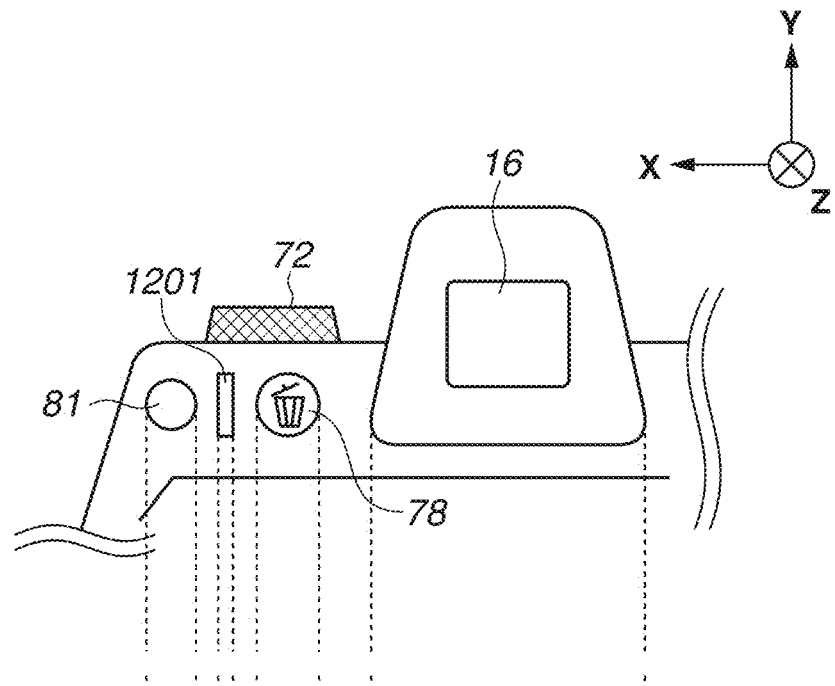
FIGS. 12A and 12B are diagrams illustrating the location of the deletion button of the digital camera.

FIG. 12A is an enlarged appearance diagram of a back surface upper left portion of the digital camera 100. The deletion button 78 is located at a position upper than the display unit 28 (at the side nearer to the shutter button 61) on the back surface portion of the digital camera 100, which is located opposite to the subject side, and on the leftward side of the eyepiece unit 16, in a case where the user grips the grip portion 90 with the right hand. Moreover, the deletion button 78 is located at a position nearer to the eyepiece unit 16 than the menu button 81, which is also located on the leftward side of the eyepiece unit 16 as with the deletion button 78. With this configuration location, even if the user tries to operate the deletion button 78 with use of an operation element having a large area, the user is not able to operate the deletion button 78 due to being hindered by the eyepiece unit 16.

Figure 12B:
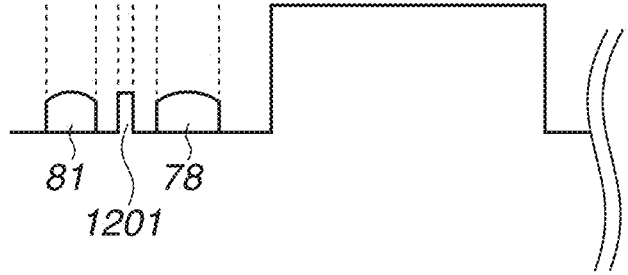

FIG. 12B is a sectional view of a back surface upper left portion of the digital camera 100. A protruding portion 1201 is provided between the deletion button 78 and the menu button 81. Thus, since the deletion button 78 is located at a position lying between the eyepiece unit 16 and the protruding portion 1201, an unintentional operation on the deletion button 78 is hindered by the eyepiece unit 16 and the protruding portion 1201. Therefore, the user is not able to press the deletion button 78 unless consciously pressing the deletion button 78 with a fingertip held up. This enables reducing the possibility of the deletion button 78 being pressed by an operation unintended by the user.

Moreover, the present exemplary embodiment pertains to not only the above-mentioned configuration location or button structure of the deletion button 78 but also a situation in which the user uses the deletion button 78. In the present exemplary embodiment, the case of switching the lock setting state by a locking function is only in the image capturing waiting state. In a case where the digital camera 100 has transitioned to playback mode processing such as that illustrated in FIG. 6, the lock target operation member is unlocked irrespective of the lock setting state (step S325 illustrated in FIG. 3). Therefore, an operation button used to switch the lock setting state is used only in the image capturing waiting state (image capturing mode processing). On the other hand, the deletion button 78 is used for a case where the user refers to the recording medium 200 and is playing back an image. While the main function of the deletion button 78 is deletion of an image in a playback screen used for playing back an image (playback mode processing), the deletion button 78 further includes, for example, a back function for returning back to a higher-level layer higher by one layer in the setting menu screen. Moreover, another function may be allocated to the deletion button 78 in mode processing other than the playback mode processing and the image capturing mode processing. Specifically, there are, for example, a quick review screen used for temporarily displaying an image captured in response to pressing of the shutter button 61 (step S314 illustrated in FIG. 3) and a setting content confirmation screen used for displaying a list of setting contents concerning image capturing. Therefore, even if the locking function is allocated to the deletion button 78, the function of image deletion and the locking function do not compete against each other, so that there is no inconvenience.

For the above-mentioned reasons, without having to locating a dedicated button having a locking function on the digital camera 100, it becomes possible to perform switching of the lock setting state of the lock target operation member. Additionally, since an operation button having another function satisfying the above-mentioned condition is used, it is possible to reduce switching of the lock setting state of the operation member unintended by the user. This enables preventing an increase in operation members and attaining a reduction in size of a casing of the digital camera 100.

Furthermore, the above-described various control operations which the system control unit 50 performs as described above can be performed by a single piece of hardware or can be performed by a plurality of pieces of hardware (for example, a plurality of processors or one or more circuits) sharing processing operations to control the entire apparatus.

Moreover, while the present disclosure has been described based on an exemplary embodiment, the present disclosure is not limited to such a specific exemplary embodiment, and various aspects within a range not departing from the gist of the present disclosure are also included in the present disclosure. Additionally, the above-described exemplary embodiment merely represents an exemplary embodiment of the present disclosure, and various exemplary embodiments can be combined as appropriate.

Moreover, while, in the above-described exemplary embodiment, a case where the present disclosure is applied to a digital camera has been described as an example, the above-described exemplary embodiment is not limited to this example, but can also be applied to any electronic apparatus as long as it includes a plurality of operation members and an operation member capable of switching the lock setting state of each of the plurality of operation members. Thus, the present disclosure can be applied to, for example, a personal computer (PC), a mobile phone terminal, a portable image viewer, a digital photo-frame, a music player, a game machine, and an electronic book reader.

Moreover, the present disclosure can be applied to not only an image capturing apparatus body but also a control apparatus which communicates with an image capturing apparatus (including a network camera) via wired or wireless communication and remotely controls the image capturing apparatus. Examples of the control apparatus which remotely controls an image capturing apparatus includes a smartphone, a tablet personal computer (PC), and a desktop PC. The control apparatus communicates, to the image capturing apparatus, commands for causing the image capturing apparatus to perform various operations and settings, based on operations performed on the control apparatus or processing performed on the control apparatus, thus being able to remotely control the image capturing apparatus. Moreover, the control apparatus can be configured to receive a live view image captured by the image capturing apparatus via wired or wireless communication and then display the received live view image.

The present disclosure can also be implemented by performing the following processing. Specifically, the processing supplies software (program) for implementing the functions of the above-described exemplary embodiment to a system or apparatus via a network or various types of storage media, and causes a computer (or a central processing unit (CPU) or a micro processing unit (MPU)) of the system or apparatus to read out and execute program code. In this case, the program and a storage medium storing the program constitute the present disclosure.

According to an exemplary embodiment of the present disclosure, it is possible to switch a lock setting state of an operation member without use of any dedicated lock member and reduce switching of the lock setting state of the operation member unintended by the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image capturing apparatus comprising:
a first operation member; a second operation member different from the first operation member;
a specific operation member different from the first operation member and the second operation member; and
at least one memory and at least one processor which function as:
a control unit configured to perform control,
wherein, in a case where the image capturing apparatus is in a first operation mode, the control unit performs a switching function of switching a locked state of an operation on the specific operation member in response to an operation on the first operation member,
wherein, in a case where the image capturing apparatus is in a second operation mode different from the first operation mode, the control unit performs a function different from the switching function in response to the operation on the first operation member, and
wherein the first operation member and the second operation member are located on a back side of the image capturing apparatus, and a surface on which the first operation member is located is nearer to a front surface of the image capturing apparatus than a surface on which the second operation member is located.

2. The image capturing apparatus according to claim 1, wherein the first operation member and the second operation member are located adjacent to each other on the back side of the image capturing apparatus.

3. The image capturing apparatus according to claim 2, wherein the first operation member is located nearer to a side surface of the image capturing apparatus than the second operation member.

4. The image capturing apparatus according to claim 1, wherein the control unit performs the same function in response to an operation on the second operation member regardless of whether the image capturing apparatus is in the first operation mode or the second operation mode.

5. The image capturing apparatus according to claim 1, wherein the control unit performs a switching function of switching between the first operation mode and the second operation mode in response to an operation on the second operation member.

6. The image capturing apparatus according to claim 1, wherein the first operation mode is an image capturing mode and the second operation mode is a playback mode.

7. The image capturing apparatus according to claim 1, wherein the second operation mode is at least one of a playback mode in which an image is reproduced, a display mode in which an image captured in image capturing is displayed immediately after the image capturing and a display mode in which a setting menu screen is displayed.

8. The image capturing apparatus according to claim 1, wherein a display unit is located on the back side of the image capturing apparatus and the second operation member is located nearer to the display unit than the first operation member.

9. The image capturing apparatus according to claim 1, wherein, in a case where the first operation mode is switched to the second operation mode when the operation on the specific operation member is in the locked state due to the operation on the first operation member in the first operation mode, the control unit releases the locked state on the specific operation member in the second operation mode.

10. The image capturing apparatus according to claim 1, wherein a height of the first operation member, which is a height from a surface of the image capturing apparatus on which the first operation member is located to an operation surface of the first operation member, is lower than a height of the second operation member, which is a height from a surface of the image capturing apparatus on which the second operation member is located to an operation surface of the second operation member.

11. An image capturing apparatus comprising:
a first operation member;
a second operation member different from the first operation member;
a specific operation member different from the first operation member and the second operation member; and
at least one memory and at least one processor which function as:
a control unit configured to perform control,
wherein, in a case where the image capturing apparatus is in a first operation mode, the control unit performs a switching function of switching a locked state of an operation on the specific operation member in response to an operation on the first operation member,
wherein, in a case where the image capturing apparatus is in a second operation mode different from the first operation mode, the control unit performs a function different from the switching function in response to the operation on the first operation member, wherein the first operation member and the second operation member are located on a back side of the image capturing apparatus, and the first operation member is located on a surface of the back side of the image capturing apparatus, which is nearer to a front surface of the image capturing apparatus than a surface on which the second operation member is located, and wherein a height of the first operation member, which is a height from a surface of the image capturing apparatus on which the first operation member is located to an operation surface of the first operation member, is lower than a height of the second operation member, which is a height from a surface of the image capturing apparatus on which the second operation member is located to an operation surface of the second operation member.

12. The image capturing apparatus according to claim 11, wherein the first operation member and the second operation member are located adjacent to each other on the back side of the image capturing apparatus.

13. The image capturing apparatus according to claim 12, wherein the first operation member is located nearer to a side surface of the image capturing apparatus than the second operation member.

14. The image capturing apparatus according to claim 11, wherein the control unit performs the same function in response to an operation on the second operation member regardless of whether the image capturing apparatus is in the first operation mode or the second operation mode.

15. The image capturing apparatus according to claim 11, wherein the control unit performs a switching function of switching between the first operation mode and the second operation mode in response to an operation on the second operation member.

16. The image capturing apparatus according to claim 11, wherein the first operation mode is an image capturing mode and the second operation mode is a playback mode.

17. The image capturing apparatus according to claim 11, wherein the second operation mode is at least one of a playback mode in which an image is reproduced, a display mode in which an image captured in image capturing is displayed immediately after the image capturing and a display mode in which a setting menu screen is displayed.

18. The image capturing apparatus according to claim 11, wherein a display unit is located on the back side of the image capturing apparatus and the second operation member is located nearer to the display unit than the first operation member.

19. The image capturing apparatus according to claim 11, wherein, in a case where the first operation mode is switched to the second operation mode when the operation on the specific operation member is in the locked state due to the operation on the first operation member in the first operation mode, the control unit releases the locked state on the specific operation member in the second operation mode.

* * * * *